US010235450B2

(12) United States Patent
Thomas

(10) Patent No.: US 10,235,450 B2
(45) Date of Patent: Mar. 19, 2019

(54) SEMANTIC LAYER FOR PROCESSING MACHINE DATA

(71) Applicant: SAP SE, Walldorf (DE)

(72) Inventor: Susan M. Thomas, Karlsruhe (DE)

(73) Assignee: SAP SE, Wallforf (DE)

( * ) Notice: Subject to any disclaimer, the term of this patent is extended or adjusted under 35 U.S.C. 154(b) by 318 days.

(21) Appl. No.: 14/976,263

(22) Filed: Dec. 21, 2015

(65) Prior Publication Data

US 2017/0177711 A1 Jun. 22, 2017

(51) Int. Cl.

*G06F 17/30* (2006.01)
*G06N 5/02* (2006.01)
*G06F 21/00* (2013.01)

(52) U.S. Cl.

CPC .. *G06F 17/30684* (2013.01); *G06F 17/30185* (2013.01); *G06F 17/30619* (2013.01); *G06F 17/30917* (2013.01); *G06F 21/00* (2013.01); *G06N 5/02* (2013.01); *G06N 5/022* (2013.01)

(58) Field of Classification Search

CPC ........................................................ G06F 17/30
See application file for complete search history.

(56) References Cited

U.S. PATENT DOCUMENTS 7,231,403 B1 * 6/2007 Howitt .................... H04L 41/00 707/999.104
2008/0133515 A1 * 6/2008 Chien ............... G06F 17/30722 707/999.006
2013/0325772 A1 * 12/2013 Bader ..................... G06F 9/542 706/20

OTHER PUBLICATIONS

Internet article, entitled "Common Intrusion Detection Framework," retrieved from http://gost.isi.edu/cidf/, last updated on Sep. 10, 1999.
Internet article, entitled "A Common Intrusion Specification Language (CISL)," retrieved from http://gost.isi.edu/cidf/drafats/language199990506.text. Last revised on May 6, 1999.

* cited by examiner

*Primary Examiner* — Khanh B Pham
(74) *Attorney, Agent, or Firm* — Fountainhead Law Group P.C.

(57) ABSTRACT

Improved techniques for processing machine data are disclosed. Embodiments are operable to receive machine data input, interpret its meaning, and then represent that meaning in a knowledge base that grows over time with each new entry. The knowledge base enables extension of both syntax and lexicon, which are the main determinants of meaning. As new entries are added, the knowledge in the knowledge base grows. Over time, the knowledge base acquires more meaning. The disclosed machine data processing system includes entry type recognition, mapping entry types to semantic events, and building entries in the knowledge base based on the semantic event-entry type mapping. Data generated by this process may be used to conduct searches for patterns of semantic events across multiple different machine data sources. This information may then be used to perform useful work such as detecting security threats, identifying operational problems, or tracking customer purchases, etc.

20 Claims, 12 Drawing Sheets

SEMANTIC LAYER FOR PROCESSING MACHINE DATA

TECHNICAL FIELD

At least certain embodiments disclosed herein relate generally to processing machine data, and more particularly to semantic layer configured to interpret and represent machine data in information processing environments.

BACKGROUND

Machine data can be utilized to document the activity and behavior for information technology ("IT") systems. IT systems are constantly logging their own machine data, and, therefore generate a vast amount and wide variety of machine data such as IT activity logs, system or device configuration data, network messages, database records, application programming interfaces ("APIs") data, telephone records, sensor data, etc.

Activities such as troubleshooting IT systems, detecting operational trends, catching security issues, and measuring business performance, generally require organizing and understanding machine data. System administrators have a need to access and comprehend the machine data from one or more components of an IT system for the purpose of locating and correcting problems during operation, security analysts have a need to understand patterns of machine data behavior to identify potential security threats, and business people have a need to trace machine data across various components of an IT system to follow the activities customers perform when purchasing products or services. But the overwhelming volume, different and changing formats, and overall complexity of machine data create significant difficulty for software developers, system administrators, and business people who need to gain insight into IT system functions and behaviors.

This problem is compounded by the fact that information systems—and the machine data they generate—continue to grow in complexity and size. Machine data comes in a wide array of unpredictable formats and conventional monitoring and analysis tools are not designed for the variety, velocity, volume, or variability of this data. In addition, conventional methods of organizing and understanding machine data across multiple information systems and domains suffer from an inability to effectively keep up with changing machine data.

SUMMARY

The embodiments described herein include improved techniques for processing machine data. In one embodiment, a method for processing machine data is disclosed comprising receiving an instance of machine data from a data source comprising text and one or more variables, extracting the text and variables from the instance of machine data, mapping an entry type for the machine data to a matching entry type stored in a database based on comparing the text and variables of the instance of machine data with corresponding text and variables of a plurality of entry types stored in the database, and assigning an entry type to the instance of machine data that matches with the instance of machine data based on the comparison.

The method may further comprise relating the entry type assigned to the instance of machine data with a set of attributes, mapping the entry type to a semantic event, building an entry for the instance of machine data in the database, and wherein the entry in the database comprises the semantic event, the set of attributes, the mapping between the semantic event and the entry type for the instance of machine data, and storing the entry in a data structure of the database. In one embodiment, wherein the entry in the database comprises the semantic event, the set of attributes, and the mapping between the semantic event and the entry type for the instance of machine data.

In one embodiment, building the entry in the database comprises storing the variables of the instance of machine data into semantic attributes associated with the semantic event in the data structure. The syntax of the core meaning assigned to the semantic event may relate the semantic event to the set of attributes.

In another embodiment, a system for processing machine data is disclosed comprising a processor in communication with a database over a communication network, a system memory in communication with the processor via a communication medium, where the system memory is configured to store programmed computer code, which when executed by the processor, causes the processor to perform operations comprising receiving an instance of machine data from a data source comprising text and one or more variables, extracting the text and variables from the instance of machine data, mapping an entry type for the machine data to a matching entry type stored in a database based on comparing the text and variables of the instance of machine data with corresponding text and variables of a plurality of entry types stored in the database, and assigning an entry type to the instance of machine data that matches with the instance of machine data based on the comparison.

In one embodiment, the operations may further comprise relating the entry type assigned to the instance of machine data with a set of attributes, mapping the entry type to a semantic event, building an entry for the instance of machine data in the database, and storing the entry in a data structure of the database. In one embodiment, the entry in the database comprises the semantic event, the set of attributes, and the mapping between the semantic event and the entry type for the instance of machine data.

In yet other embodiments, a computer readable storage medium embodying programmed computer code is disclosed, which when executed by a computer system, causes the computer system to perform operations for processing machine data comprising receiving an instance of machine data from a data source comprising text and one or more variables, extracting the text and variables from the instance of machine data, mapping an entry type for the machine data to a matching entry type stored in a database based on comparing the text and variables of the instance of machine data with corresponding text and variables of a plurality of entry types stored in the database, assigning an entry type to the instance of machine data that matches with the instance of machine data based on the comparison, relating the entry type assigned to the instance of machine data with a set of attributes, mapping the entry type to a semantic event, building an entry for the instance of machine data in the database, and storing the entry in a data structure of the database. The entry in the database may comprise the semantic event, the set of attributes, and the mapping between the semantic event and the entry type for the instance of machine data.

The following detailed description and accompanying drawings provide a better understanding of the nature and advantages of the present invention.

BRIEF DESCRIPTION OF THE DRAWINGS

For a better understanding of at least certain embodiments, reference will be made to the following detailed description, which is to be read in conjunction with the accompanying drawings.

DETAILED DESCRIPTION

Figure 1:
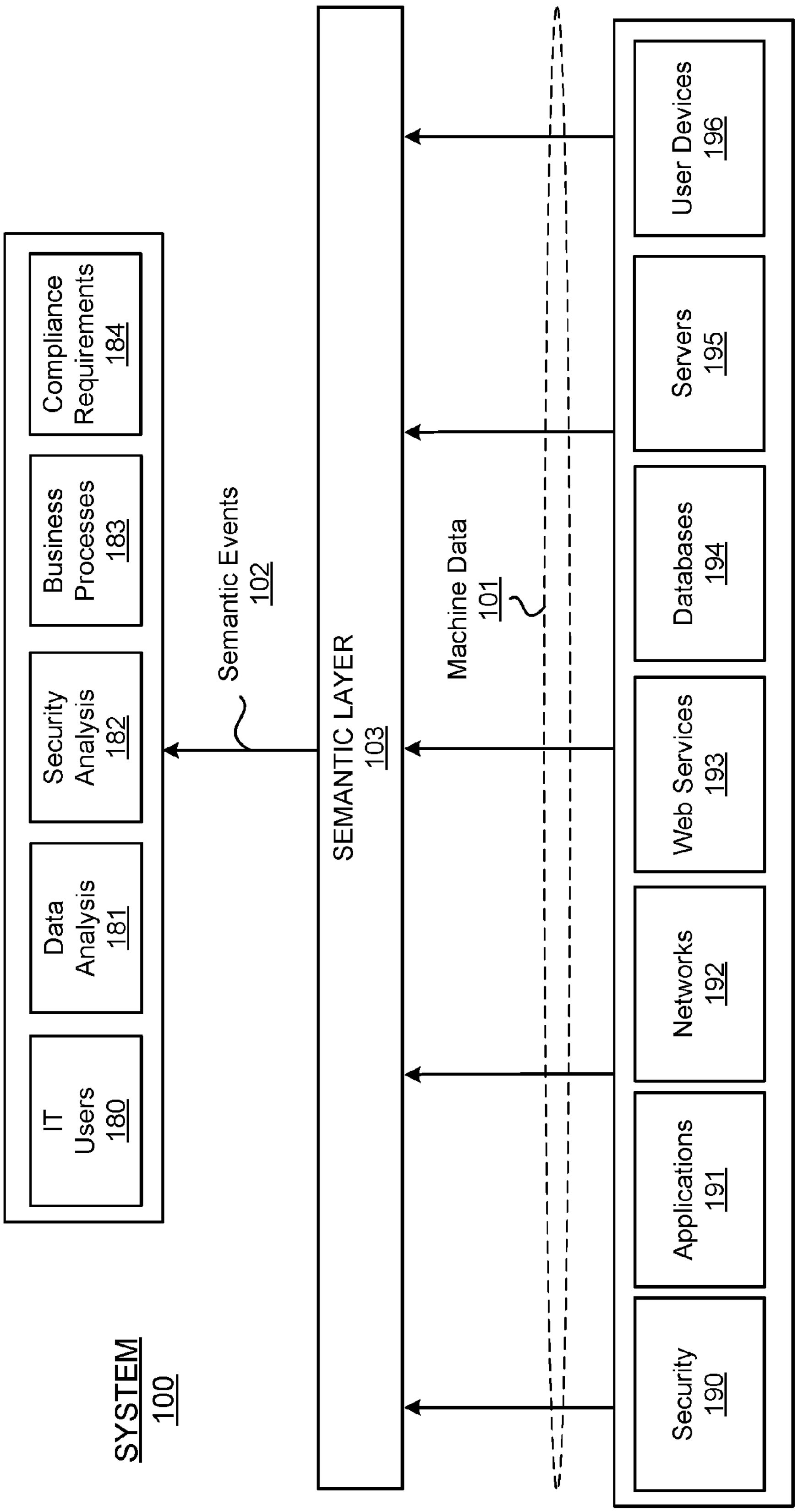
FIG. 1 depicts an overview block diagram of an example system for processing machine data configured according to the techniques described herein.

Throughout the description, for the purposes of explanation, numerous specific details are set forth in order to provide a thorough understanding of this present disclosure. It will be apparent to one skilled in the art, however, that the techniques described herein may be practiced without some of these specific details. In other instances, well-known structures and devices may be shown in block diagram form to avoid obscuring the underlying principles of the invention.

The embodiments described herein relate to an improved system and method for processing machine data. Embodiments are operable to receive machine data input, interpret its meaning, and then to represent that meaning in a knowledge base that grows over time with each new entry. The data generated by this process may then be used to perform useful work such as detecting security threats, identifying operational problems with the data source, or tracking customer purchases, or other patterns of events, etc.

As used herein a "knowledge base" refers to a collection of information structured around systems, services, resources, or events, etc. The knowledge base can be thought of as representing the syntax of the primary events found in machine data, plus the lexicon used within that syntax. "Syntax" refers to the hierarchical structure of the words in a sentence that provides its meaning. "Lexicon" refers to a collection of terms utilized for a specific purpose. Together syntax and lexicon may be leveraged to capture the meaning of machine data.

The terms in a lexicon are used in sentences to create meaning. As used herein, the term "core meaning" refers to a sentence or group of sentences that uses roles, actions, and lexicon items to give meaning to an event in machine data. The syntax and lexicon of the core meaning relates systems, hosts, and users to events based on their respective roles in it. This includes the involvement of resources, services, etc. Core meaning can be represented by the syntax of the sentences and may be stored as a data model in one or more data structures of the knowledge database.

Both syntax and lexicon are extensible. The knowledge base enables extension of both syntax and lexicon, which are the main determinants of meaning. Over time, the syntax and lexicon grows in the knowledge base. As the knowledge base extends, it can acquire additional meaning. As new entries are added, the knowledge in the knowledge base grows.

I. Exemplary Systems

Provided below is a description of example systems upon which the embodiments described herein may be implemented. Although certain features may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The described functionality may be performed by custom hardware components containing hardwired logic for performing operations, software components programmed to perform the novel operations of the techniques described herein, or any combination of hardware and programmed software components. The techniques described herein are not limited to any specific combination of hardware circuitry or software. The embodiments described herein can also be practiced in distributed computing environments where tasks are performed by remote data processing devices or systems that are linked through one or more wire-based or wireless networks.

FIG. 1 depicts an overview block diagram of an example system for processing machine data configured according to the techniques described herein. The illustrated embodiment shows machine data 101 being provided by a number of machine data sources including security data sources 190, applications data sources 191, network data sources 192, web services data sources 193, database(s) data sources 194, server data sources 195, and user device data sources 196. These data sources 190-196 are described by way of example, and not of limitation, as any source of machine data is contemplated within the scope of the embodiments described herein.

System 100 further includes a semantic layer 103 configured to receive machine data from the various data sources 190-196 and to convert (e.g., map) instances of the received machine data to semantic events 102. Once assigned to an instance of machine data from a particular machine data source, the corresponding semantic events 102 can be provided to one or more systems for further processing and for conducting useful work. In the illustrated embodiment, system 100 depicts providing semantic events to IT users 180, data analysis tools 181, security analysist tools 182, business processes 183, and to meet compliance requirements 184, etc. The embodiments of the system 100 for processing machine data are not limited to any particular of these target systems 180-184. Any system configured to process machine data as semantic events is contemplated to be within the scope of the embodiments described herein.

A primary event is one whose basic meaning can be reduced either to a verb, e.g., "logon", or a verb plus its direct object, e.g., "create user". An event can be thought of as a specialization of core meaning of an instance of machine data, such as an entry in a log file. A secondary event refers to more than one primary event and relates them, e.g., a "logon" after a "create user" event. Events can be divided into a few categories including (1) action—an action has an agent that performs the action, (2) transition—a transition by its nature has no agent, it just occurs or is caused by the service itself, (3) parameter check or state check—these two events provide the value of a parameter or state, (4) health check—often reports some statistics that indicate the health of the software, (5) existence event—an event reporting the existence of something undesirable, e.g., an invalid value in a message parameter, malformed parameter event, or a potential threat or attack.

An example action event is a user drops a table from a database (drop table event). An example transition event is the interface Ethernet_0 is down (state change event). An example parameter check is discovering whether a configuration parameter has a value of zero. An example health check event is the number of received packets since the last health check. The difference between an action and a transition can be visible in event names and core meanings. For example, contrast an action with a transition as follows:

Action: An :actor change#s the state: of a service: (short name: change state)

Transition: The state: of a networkInterface: change#s (short name: state change)

An actor may be the host or system on which the service is running when it logs one of its events. The core meaning indicates where to put the attributes of hosts and systems, the IP address of the recipient. The core meaning also indicates which set of attributes to use.

Figure 2:
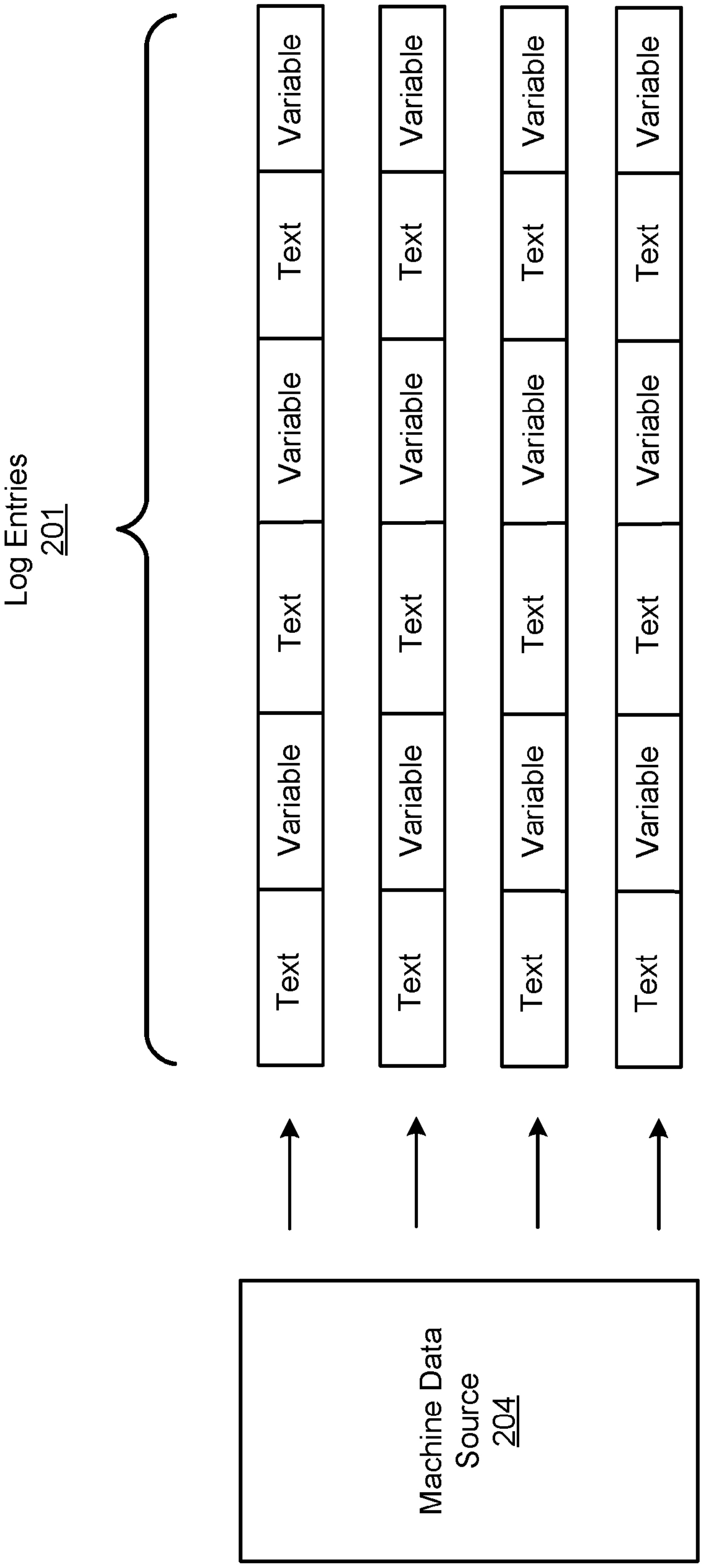
FIG. 2 depicts an example block diagram of log entries from a machine data source.

FIG. 2 depicts an example block diagram of log entries 201 provided from a machine data source 204. The machine data source 204 is depicted providing the log entries 201 (or other machine data). As shown in the illustrated embodiment, the log entries 201 include a plurality of fields for text and variables corresponding to the respective text and variables of the log entries 201. The log entries 201 (or other machine data) may be configured to report activities and/or behavior of the machine data source 204. In one embodiment, the data source 204 includes an IT information system. In the illustrated embodiment, the machine data 201 includes both text and variable fields; however, in some embodiments the machine data may only include text or may only include variables.

Figure 3:
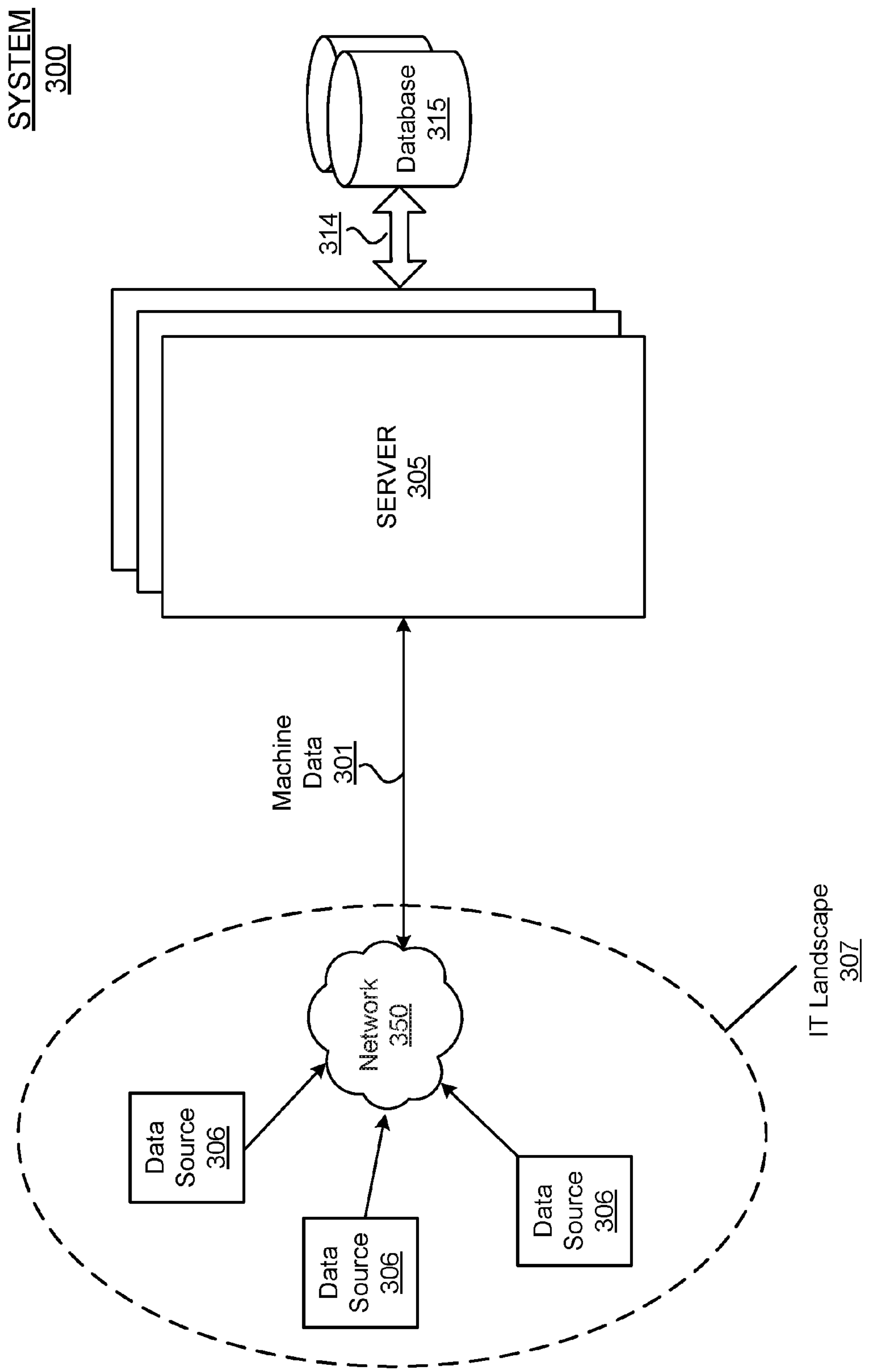
FIG. 3 depicts an overview block diagram of an example network configuration for processing machine data according to the techniques described herein.

FIG. 3 depicts an overview block diagram of an example system configured for processing machine data upon which the embodiments described herein may be implemented. In the illustrated embodiment, system 300 includes a server computer 305 operable to receive machine data 301 from a plurality of data sources 306 in an IT landscape 307 via one or more networks 350. The server 301 may be implemented as an individual computer hardware server or as an array of computer hardware servers logically connected together and working in coordination to perform the functionality described herein. Generally, a data server includes a system configured to perform data access operations with respect to data stored in one or more repositories of data (e.g., database(s) 315). Depending on the type of server 305, data operations may range from simple operations, such as storing and retrieving data, to more complex operations such as computing process or calculating statistics based on the data; or arranging, modifying, or formatting data.

As shown, the machine data sources 306 may be configured to communicate with server computer 305 via one or more communication networks 350. The server 305 can be configured to perform data accesses operations on data stored in database 315 via a communications link 314.

As will be appreciated by persons of skill in the art, network(s) 350 can be implemented as a single wired or wireless network, or multiple separate networks in communication with one another. Network(s) 350 can be implemented as any wired or wireless network(s). For example, the networks described herein can be implemented as a local area network ("LAN"), wide-area network ("WAN"), combination of LANs and WANs, the Internet, or any other type of communication network adapted for exchanging electronic messages and information. Further, network(s) 350 can be implemented as a physical array of hardware resources or as a virtual array, or any combination thereof. Network(s) 350 can also be implemented in a cloud-based network configuration. For example, network(s) 350 can be implemented as public or private cloud network, or combination thereof. No specific network or network architecture should be construed as limiting the embodiments and techniques described herein.

Server 305 is in communication with one or more databases 315 adapted to store machine data 301 (via one or more communications links 314). In one embodiment, server 305 may be in remote communication with the database 315 via one or more networks 314. Alternatively, database 315 may be a component of the computer server 305 and configured to communicate with the server 305 via a direct or indirect connection or network 314. Database(s) 315 may be implemented as any type of database system. One example embodiment includes a relational database system in which data is stored in structured database tables comprised of rows and columns, and accessed through data storage rules (or schemas). Other examples of database systems 315 include event-based systems where data can be stored in a semi-structured or unstructured format.

Figure 4:
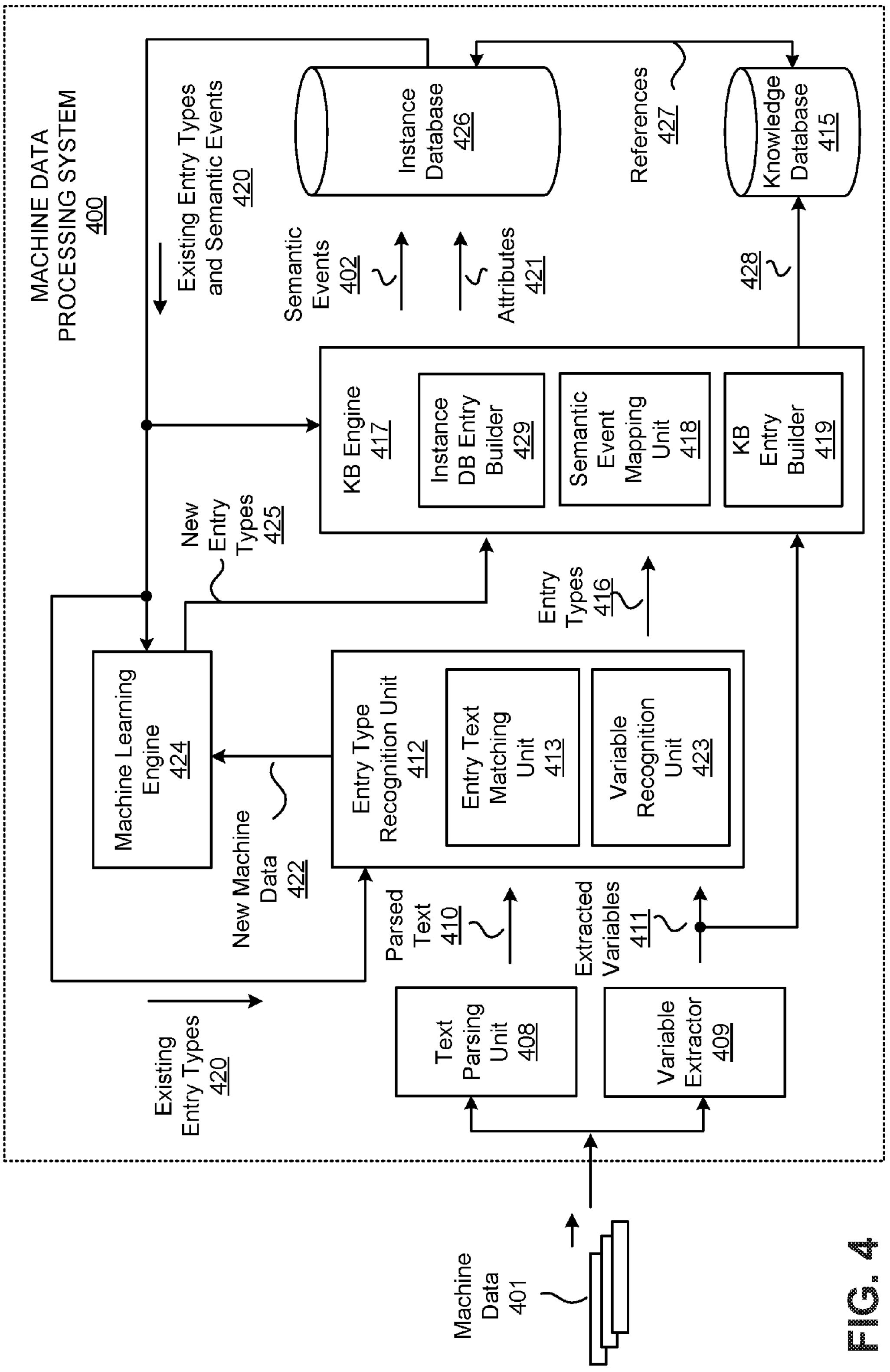
FIG. 4 depicts a block diagram of an example embodiment of a system for processing machine data according to the techniques described herein.

FIG. 4 depicts a block diagram of an example embodiment of a system for processing machine data according to the techniques described herein. In the example illustrated embodiment, the machine data processing system 400 comprises a text parsing unit 408, a variable extractor 409, an entry type recognition unit 412, a machine learning engine 424, an instance data base 426, a knowledge base (e.g., knowledge database) 415; and a knowledge base ("KB") engine 417 in communication with the instance database 426 and the knowledge database 415. In one embodiment, the instance database 426 and the knowledge database 415 may be different databases; but in alternative embodiments, the instance database 426 and the knowledge database 415 may be located in the same physical database, or in an array of databases working in a functionally coordinated manner.

As shown, the machine data processing system 400 is configured to receive machine data (e.g., log entries) 401. The text parsing unit 408 is operable to parse the text of the machine data 401 received by the machine data processing system 400 to provide the parsed text 410 to the entry type recognition unit 412 Likewise, the variable extractor 409 is operable to extract the variables from the machine data 401 and to provide the extracted variables 411 to the entry type recognition unit 412. As used herein, the term "entry type" refers to a type of entry in machine data (such as log data), often identified by a code called the "message code" or "event code", and an "entry" refers to an instance of an entry type, often a line of a log file, from a particular system. An entry usually reports the actions of one of the system's services. An entry is an instance of some event—each entry type is associated with an event. A "service" refers to a function provided by a piece of software to humans or to other pieces of software. This is a very generic term that covers dedicated hardware devices, as well as the kind of software that can be deployed on hosts in a network, e.g., a web server. A service is an active IT element as opposed to "resources", which are passive IT elements.

The entry type recognition unit 412 comprises an entry text matching unit 413 and a variable recognition unit 423. The text and variables of existing entry types 420 stored in the instance database 426 may be provided to the entry type recognition unit 412 as shown. In at least certain embodiments, the entry text matching unit 413 is operable to receive the parsed text 410 from the instances of the machine data 401, compare the parsed text 410 with text of a plurality of existing entry types 420 of machine data stored in the instance database 426, and match the parsed text 410 with text of an existing entry type 420. Similarly, the variable extractor 409 may receive the extracted variables 411 from the instances of the machine data 401, compare the extracted variables 411 with variables of the plurality of existing entry types 420 of machine data stored in the instance database 426, and match the extracted variables 411 with the variables of an existing entry type 420.

The entry recognition unit 412 is designed to identify the fixed and variable components of machine data instances and groups them into entry types 416. The entry type recognition unit 412 may then provide the entry types 416 that match with the received instance of machine data 401 to the KB engine 417. In one embodiment, an entry type 416 may be assigned to the instance of machine data 401 based on matching the parsed text 410 and the extracted variables 411 of the received machine data 401 with corresponding text and variables of an existing entry type 420 stored in the instance database 426. The entry type 416 assigned to the received instance of machine data 401 may thereafter be provided to the KB engine 417 for further processing. In one embodiment, entry types 416 may also be identified based on recognizing a unique code within the corresponding entry.

In the illustrated embodiment of FIG. 4, the KB engine 417 comprises a semantic event mapping unit 418, an instance database entry builder 429, and a knowledge base (KB) entry builder 419. The semantic event mapping unit 418 may be operable to receive an entry type 416 assigned to a received instance of machine data 401 and to map the entry type 416 to a semantic event 402 to be stored with a plurality of semantic events 402 in the instance database 426. This information may be provided from the existing semantic events 420 stored in the instance database 426. The mapped semantic event 402 may then be related with a set of known attributes 421 associated with the semantic event 402 that may also be stored in the instance database 426 and provided to the KB engine 417 via line 420. The instance database builder 429 may be configured to process the attributes 421 that are associated with a corresponding semantic event 402 to build an entry in the instance database 426 comprising a semantic event 402 and its corresponding attributes 421. The syntax of the entry in the instance database 426 may relate the semantic event 402 to the corresponding set of attributes 421.

Entry types 416 can be mapped to existing semantic events 420 stored in the instance database 426. To map semantic events, a "predicate" may be constructed of the event, which is either a verb (intransitive verb) or a verb and a noun phrase (transitive verb). The system can determine what action best describes what is communicated by the semantic event. If the verb is essentially transitive like "logon", "logoff," and "debug", the predicate is just the verb, e.g., "debug". Otherwise, the predicate may be the verb plus the direct object, e.g., "block request". Predicates may be used as the short names for the semantic events 402, so that a search of the instance database 426 for a particular predicate can be conducted to find potential matches with the entry type 416 of the instance of machine data 401. If the event in the entry type 416 is not an action event, then the search may be conducted over other types of events, which may have nouns as names such as "attack", "state change", "parameter change", "malformed parameter", "health check", etc. If there is no matching semantic event 402 in the instance database 426, one can be generated as described in detail below in the discussion relating to machine learning.

In cases where the entry type recognition unit 412 receives an unrecognized entry type for an instance of machine data 401, the entry type recognition unit 412 may be further configured to communicate the unrecognized entry type as new machine data 422 to a machine learning engine 424 adapted to construct a new entry type 425 based on a comparing the new machine data 422 with existing entry types 420 from the instance database 426 to find a closest match. In at least certain embodiments, the machine learning engine 424 is configured to receive the new machine data 422 and to generate a new entry type 425 for the unrecognized instance of machine data 401 based on comparing the text and variables of the unrecognized entry type of machine data 401 with the text and variables of existing entry types 420. The new entry type 425 for the unrecognized instance of machine data may be an entry type that is the closest match with existing entry types 420 stored in the instance database 426. The new entry type 425 may then be provided to the KB engine 417 and later stored as a new entry in the instance database 426.

Machine data processing system 400 includes knowledge database 415. In one embodiment, the knowledge database 415 may be configured to store a core meaning for each semantic event 402 as well as the mapping between semantic events and their assigned core meaning. The syntax and lexicon of the core meaning relates systems, hosts, and users to events based on their respective roles in it. This includes the involvement of resources, services, etc. Core meaning can be represented by the syntax of the sentences and may be stored as a data model in one or more data structures in the knowledge database 415.

In one embodiment, core meaning for semantic events can be determined at the KB entry builder 419 in the KB engine 417 based on analyzing syntax associated with the semantic events. Alternatively the core meaning may be input to by a user at a user interface (not shown) to the machine data processing system 400. The KB entry builder 419 may then construct an entry 428 to the knowledge database 415 comprising the semantic event and corresponding core meaning assigned to it. Knowledge database 415 includes one or more references 427 between entry 428 in the knowledge database 415 and the corresponding semantic events stored in the instance database 426.

Figure 5:
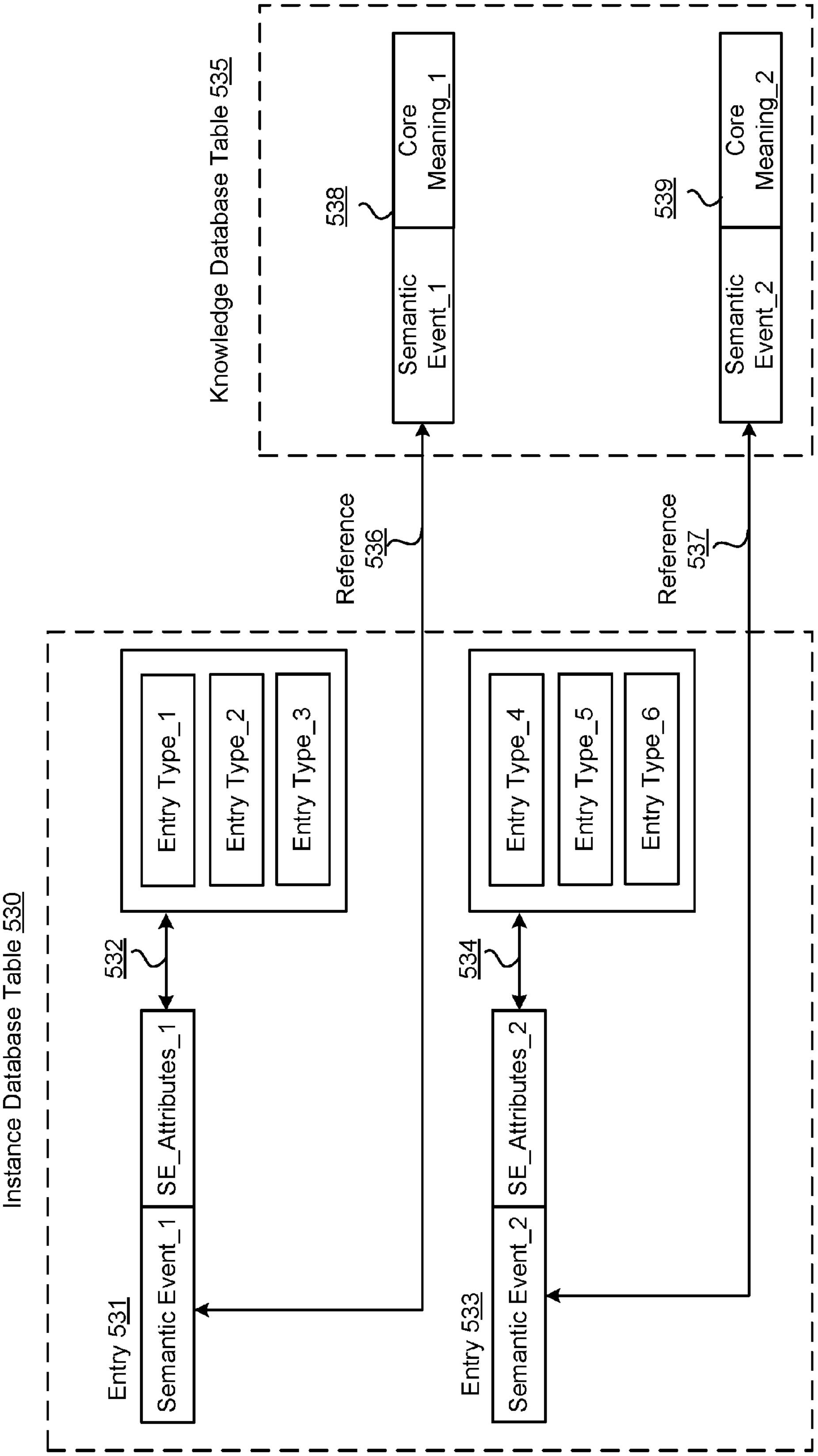
FIG. 5 depicts a block diagram of an example embodiment of an instance database table referenced with a knowledge database table according to the techniques described herein.

This is shown in FIG. 5, which depicts a block diagram of an example embodiment of an instance database table 530 referenced with a knowledge database table 535. In the illustrated embodiment, entry 531 of the instance database table 530 comprises a field for semantic event_1 and one or more fields for a corresponding set semantic event attributes SE_attributes_1 Likewise, entry 533 of the instance database table 530 comprises a field for semantic event_2 and one or more fields for a corresponding set semantic event attributes SE_attributes_2. The variables extracted from the instance of machine data can be stored into the appropriate attribute names for the respective SE attributes of the instance database table entries 531 and 533 respectively.

More than one event type may correspond to a particular semantic event. The instance database table 530 comprises the mapping 532 between the semantic event and the one or more event types. In FIG. 5, semantic event_1 of entry 531 and the multiple event types including event type_1, event type_2, and event type_3, and the mapping 534 between the semantic event_2 of entry 533 and the multiple event types including event type_4, event type_5, and event type_6.

At least certain embodiments described herein are further adapted to assign a core meaning to semantic events. In the illustrated embodiment, entry 531 includes a reference 536 to entry 538 of the knowledge database table 535 and entry 533 includes a reference 537 to entry 539 of the knowledge database table. Entry 538 of the knowledge database table 535 includes the semantic event_1 from the instance database table 530 and a core meaning_1 assigned to the semantic event_1 and entry 539 includes the semantic event_2 from the instance database table 530 and a core meaning_2 assigned to the semantic event_2.

In one embodiment, the core meaning_1 assigned to semantic event_1 and the core meaning_2 assigned to semantic event_2 may include fields for (1) an action performed by the instance of machine data, (2) the system or host role for the instance of machine data, (3) the username role for the instance of machine data, (4) any triggering events for the instance of machine data, (5) the service invoked by the instance of machine data, and (6) any resources utilized by the instance of machine data. Other data fields for the core meaning are possible, including any parameters, privileges, grantor/grantee data, etc.

The mapping of semantic events to core meanings may guide the use of the semantic attributes to store values from the instances of events derived from it. The above example core meaning_1 uses attributes SE_attributes_1 from semantic event_1 to specify the initiator and actor host/system and the resource type for the resource. Attributes associated with the actor may include hostname, type, domain, local name, IP address, port, system type, system ID, etc. The syntax and placeholders can represent the core meaning of a semantic event.

The knowledge base 515 can grow with time as new types of software and new machine data types are added to it. The knowledge base 515 grows as new entry types and new semantic events are added. The knowledge base 515 allows both syntax and lexicon, which are the main determinants of meaning. Over time the syntax and lexicon grow while the attributes may remain static, although addition of attributes may be necessary for new entry types.

Figure 6:
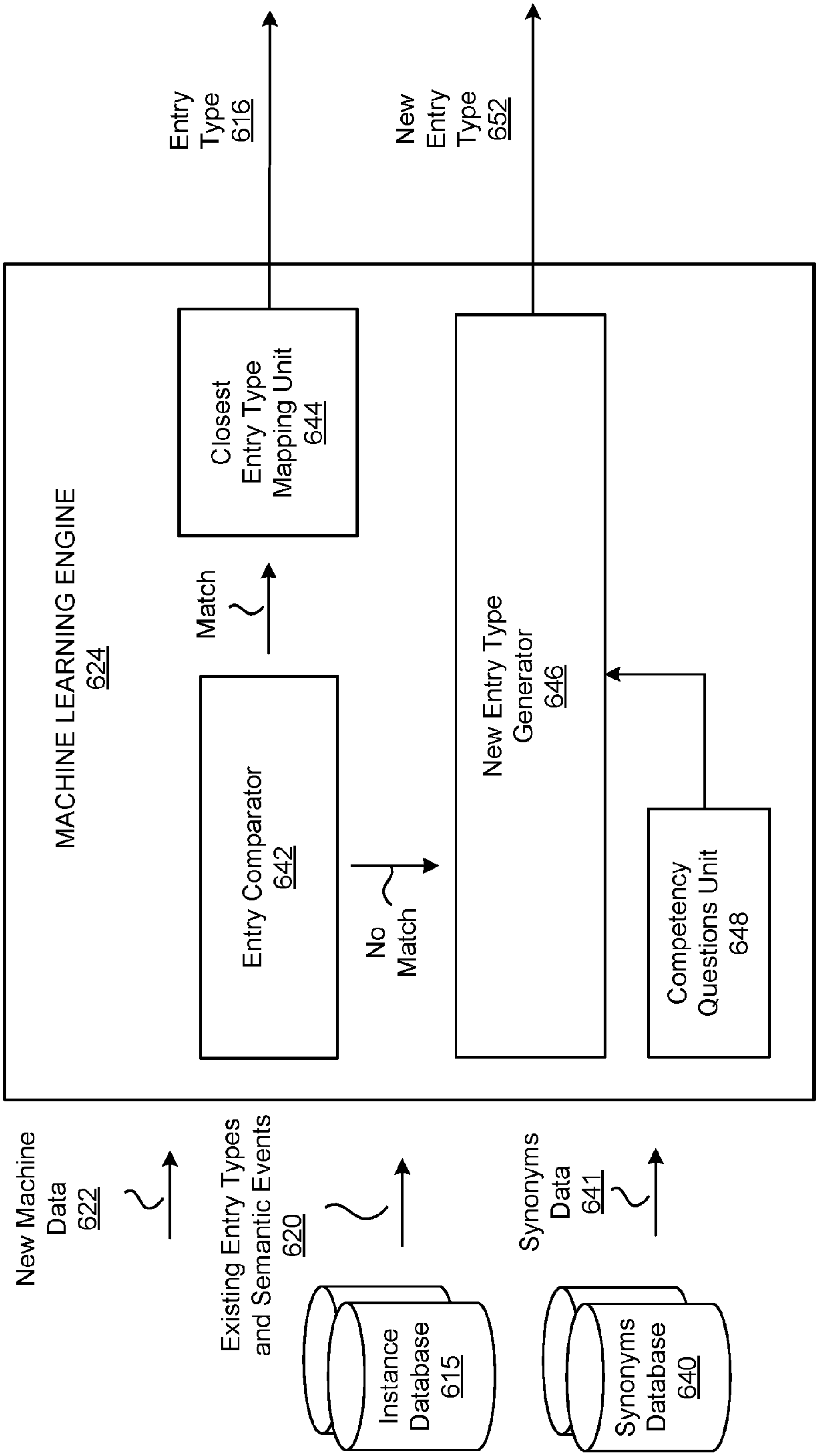
FIG. 6 depicts a block diagram of an example embodiment of a machine learning engine configured according to the techniques described herein.

In one embodiment, the knowledge base 515 may be further extended through automated machine learning. FIG. 6 depicts a block diagram of an example embodiment of a machine learning engine configured according to the techniques described herein. During machine learning, the entry type may be assigned to a semantic event, and its variables are mapped to semantic attributes related to the semantic event. In one embodiment, the machine learning may generate a log parser that can recognize the log entry type, parse it to extract the variables, and store them in a database. In cases where the entry type recognition unit 412 receives an unrecognized entry type for an instance of machine data, the entry type recognition unit 412 may be configured to map the unrecognized entry type to a closest matching entry type stored in the instance database 426 based on comparing and matching the text and variables of the unrecognized entry type with a threshold amount of text and variables of each of the known entry types stored in the instance database 426.

In the illustrated embodiment, the machine learning engine 624 comprises an entry comparator unit 642, a closest entry type mapping unit 644, a new entry type generator unit 646, and a competency questions unit 648. The machine learning engine 624 can be configured to receive as inputs new machine data 622 (e.g., from the entry type recognition unit 412 depicted in FIG. 4), the existing entry types and semantic events data 620 from the instance database 626 and synonyms data 641 from a synonyms database 640. The synonyms database 640 may store synonyms of lexical items. In an alternative embodiment, the entry comparator 642 and the closest entry type mapping unit 644 may be located in the entry type recognition unit 412 instead of in the machine learning engine 624.

At times when an unrecognized instance of machine data is encountered, the entry comparator 642 may be operable to receive the new machine data 622 (including text and variables extracted from the unrecognized instance of machine data) and to determine whether the text and variables associated with the new machine data 622 match text and variables of a known entry type stored in the instance database 626. Specifically, the entry comparator 642 may determine whether an amount of text and variables of the new machine data 622 matches with a threshold amount of text and variables of a known entry type stored in the instance database 626. This data can be provided to the machine learning engine 624 via the existing data 620 from the instance database 626.

If the amount of text and variables of the new machine data 622 matches with a threshold amount of text and variables of a known entry type stored in the instance database 626, the closest entry type mapping unit 644 can be configured to assign the closest matching entry type 616 to the instance of new machine data 622. If there is no matching entry type with a threshold amount of matching text and variables stored in the instance database 626, the new entry type generator 646 may be configured to generate a new entry type 652 based on matching the text and variables in the new machine data 622 with known entry types stored in the instance database 626.

This may be accomplished by starting with the existing core meanings that match or are close matches with the text and variables of the instance of machine data; and, if necessary, modify the core meaning, or create a new one for the new entry type. Any missing concepts can be added in the right locations in the lexicon hierarchies, with actions under the actions and the resources the actions affect, etc. Specializing the core meaning with concepts from the lexicon can then create events.

New synonyms can also be added via the synonym database 640. The new entry type generator 646 may include synonyms data 641 input from a synonyms database 640 to assist in generating the new entry types 652. According to the novel techniques described in this disclosure, a lexicon can be established to control vocabulary, so the same words may be used for the same or similar concepts. Synonym collection assists in finding the appropriate vocabulary. Synonyms can be more often than not context dependent. In one embodiment, the conceptual model includes information about the service type and software to give it context.

The new entry type generator 646 may also include input from a competency questions unit 648. Competency questions can be used to help design an ontology. Basically, they are a set of questions to which the ontology should be able to give answers. This concept is applied to the instance database 626 to ensure that its events and corresponding sets of attributes can give answers to questions about the instances of machine data. This process begins with the classic who, what, when, where, why, and how questions, refines them to more specific IT questions, and then gives the answers as the set of attributes that contains the answer. This can confirm that the events and attributes answer the questions posed and provide guidance on how to use the attributes.

"When" and other time related questions may include when an event occurred, when a future event is scheduled to occur and how long will it last, etc. This information may be obtained through timestamp information contained in the machine data. "What" and other related action questions may include (1) what happened, (2) what is affected by the event when the event is an action or what changed when the event is a transition, (3) which trigger was modified, (4) which user account was modified or affected, (5) what statistics are included in the entry and where do they go, (6) what was the outcome of a service run, and/or (7) what type of device does the service think the user is using, etc.

"Where" and "who" questions are more complex. For IT logs, these questions may be answered in terms of system and user accounts—which systems play which roles in the event, and which user accounts are involved in what roles. Roles may be assigned by matching variables from the instance to roles in the event. "Why" questions involve why an event happened, what triggered it to happen, or why did something fail. "How" questions involve the manner in which an action or event was performed. This may be expressed as actions and event modifiers. For example, the questions may include how a logon was performed or how severe a security threat event is.

The new entry type generator 646 may then process the new machine data 622 and generate a new entry type 652.

Figure 7:
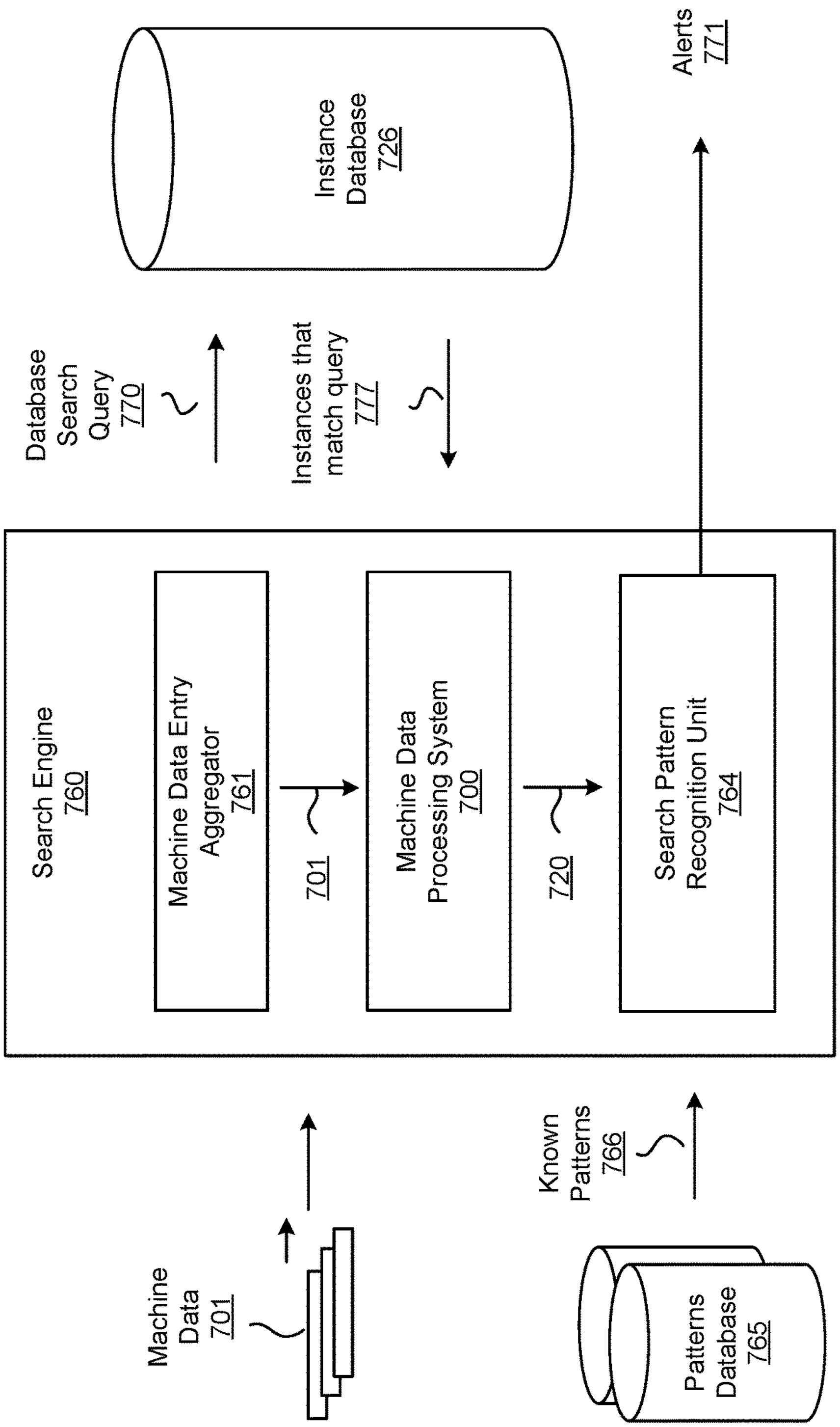
FIG. 7 depicts a block diagram of an example embodiment of a search engine configured according to the techniques described herein.

FIG. 7 depicts a block diagram of an example embodiment of a search engine configured according to the techniques described herein. In the illustrated embodiment, search engine 760 includes a machine data entry aggregator 761, a machine data processing system 700 (see machine data processing system 400 of FIG. 4), and a search pattern recognition unit 764. In this embodiment, the machine data processing system 700 is incorporated into the search engine 760. Alternatively, the machine data processing system 700 may be a separate component that provides pre-processed data to the search pattern recognition unit 764.

Entries of machine data 701 are received and aggregated at the machine data entry aggregator 761. In one embodiment, the machine data entry aggregator 761 may comprise a memory component such as a queue or buffer memory for storing the received entries of machine data 701 for further processing. The entries of machine data 701 may then be provided to the machine data processing system 700 for processing to generate the existing entry type and semantic event data 720 for each entry as described above with respect to FIG. 4. The existing data 720 includes the semantic event to entry type mapping as discussed above.

The existing data 720 may be queried from the instance database 726 using a database search query 770. Instances matching the query 770 may be returned in the query response 777 from the instance database 726.

The search pattern recognition unit 764 may then receive the existing 720 (including the assigned semantic event) for multiple entries of machine data 701. The search pattern recognition unit 764 may also receive known patterns of semantic events 766 from a separate semantic event patterns database 765. The search pattern recognition unit 764 may then search for known patterns of semantic events as set forth in the patterns data 766.

Based on the techniques described herein with respect to assigning semantic events to machine data entry types, the search pattern recognition unit 764 may search for patterns of semantic events across multiple different data sources—including previously unknown data sources. The semantic hierarchy of events and use of corresponding attributes enables very broad searches across different sources of machine data. By consistent use of attributes associated with semantic events, the described embodiments enable searches across machine data (e.g., IT logs) from different services that log the same or similar events. This in turn, can lead to using searches to provide productive work, such as for detection of security threats, locating problems during operation, or tracking customer purchases, etc.

Figure 8:
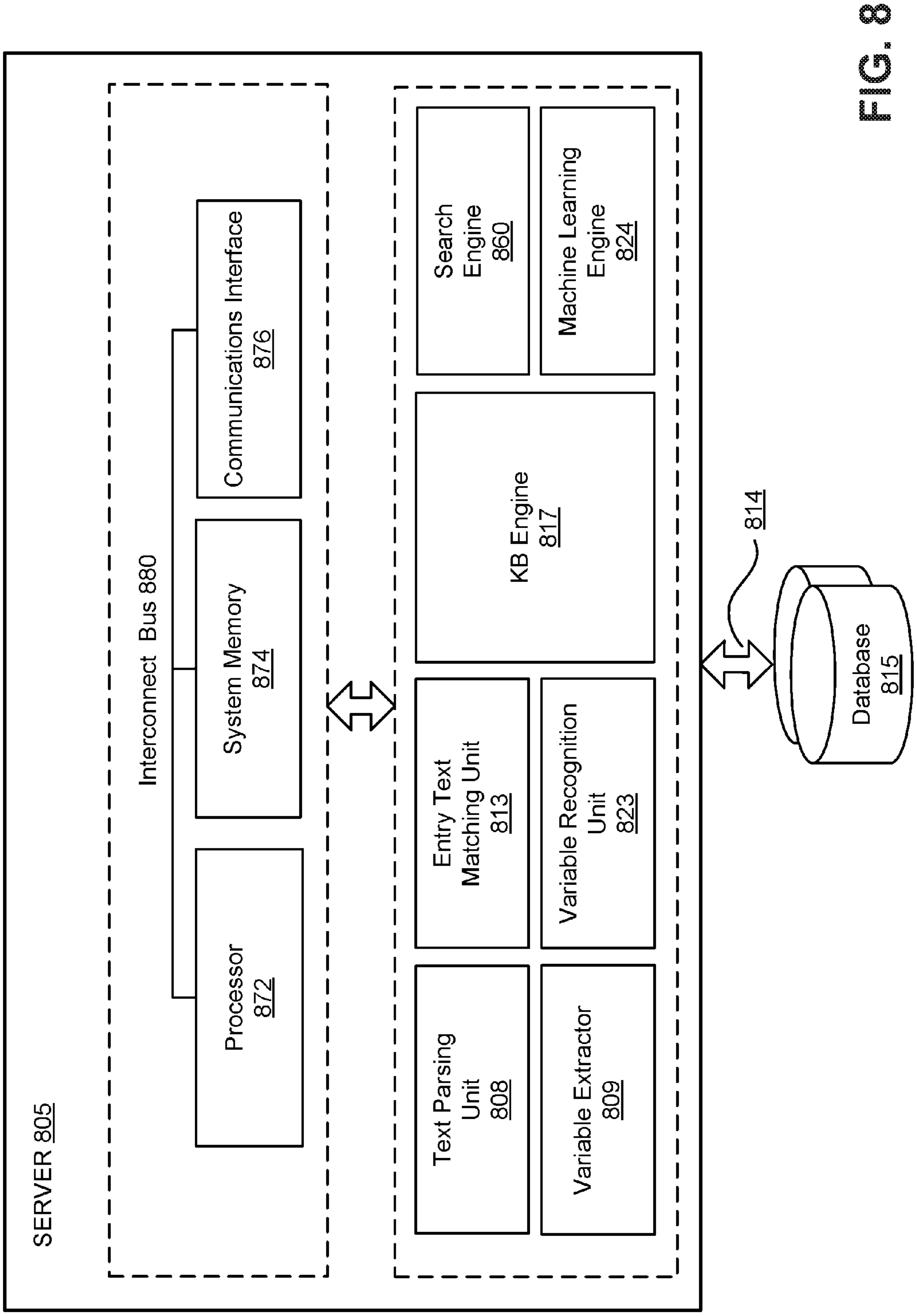
FIG. 8 depicts a block diagram of an example embodiment of a server computer configured for processing machine data according to the techniques described herein.

FIG. 8 depicts a block diagram of an example embodiment of a server computer configured for processing machine data according to the techniques described herein. In the illustrated embodiment, server 805 includes a processor 872, system memory 874, and a communications interface 876 coupled together via one or more interconnect buses 880. Server 805 further includes a text parsing unit 808, variable extractor unit 809, entry text matching unit 813, variable recognition unit 823, KB engine 817, search engine 860, and machine learning engine 824. Server 805 is further in communication with one or more databases 815 via communications medium 814. The database 815, in one embodiment, may be an instance database. As discussed above, these components of server 805 may be configured for processing machine data according to the techniques described herein.

II. Exemplary Processes

Figure 9A:
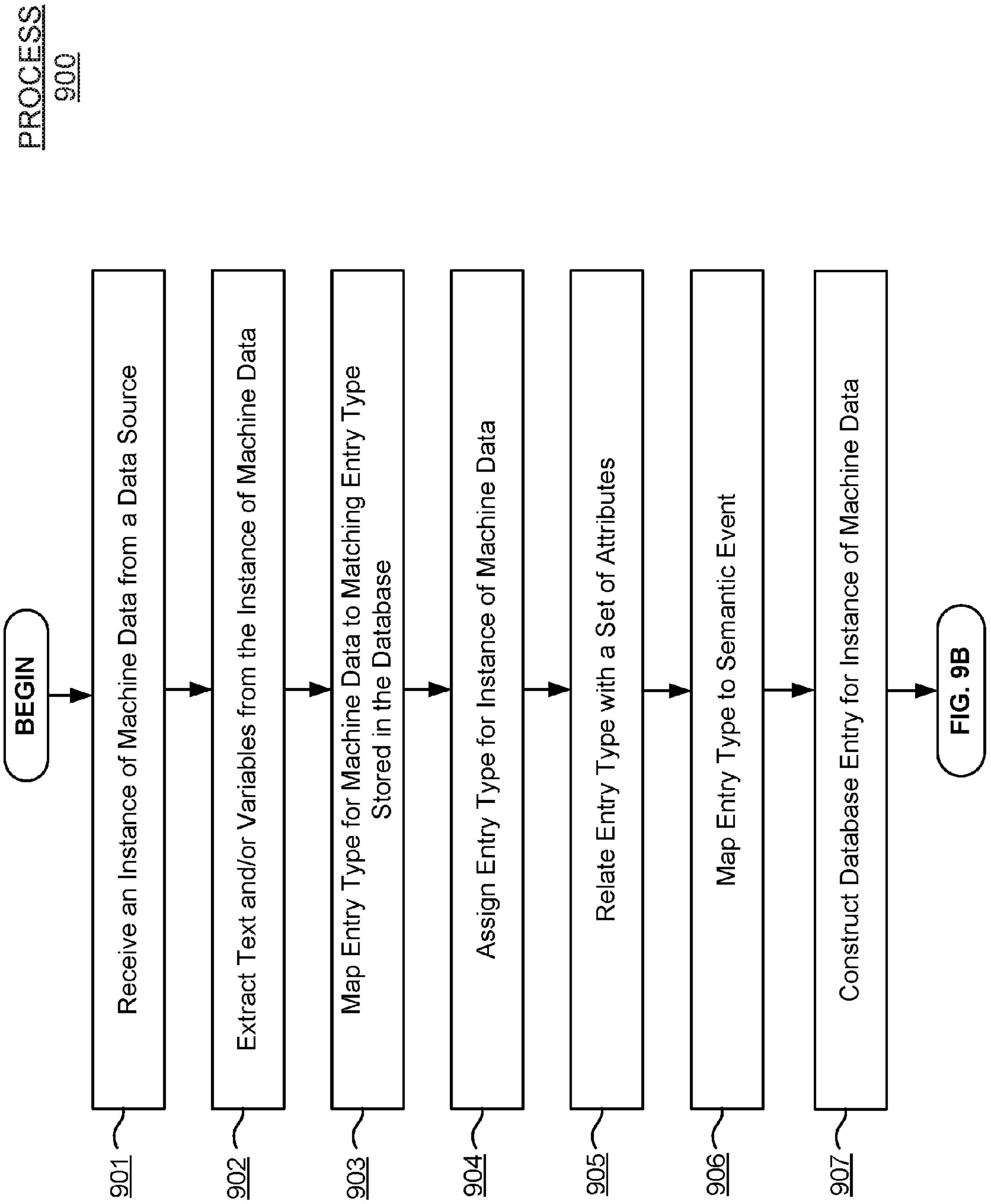
FIGS. 9A-9B depict a flow chart of an example embodiment of a process for processing machine data according to the techniques described herein.
Figure 9B:
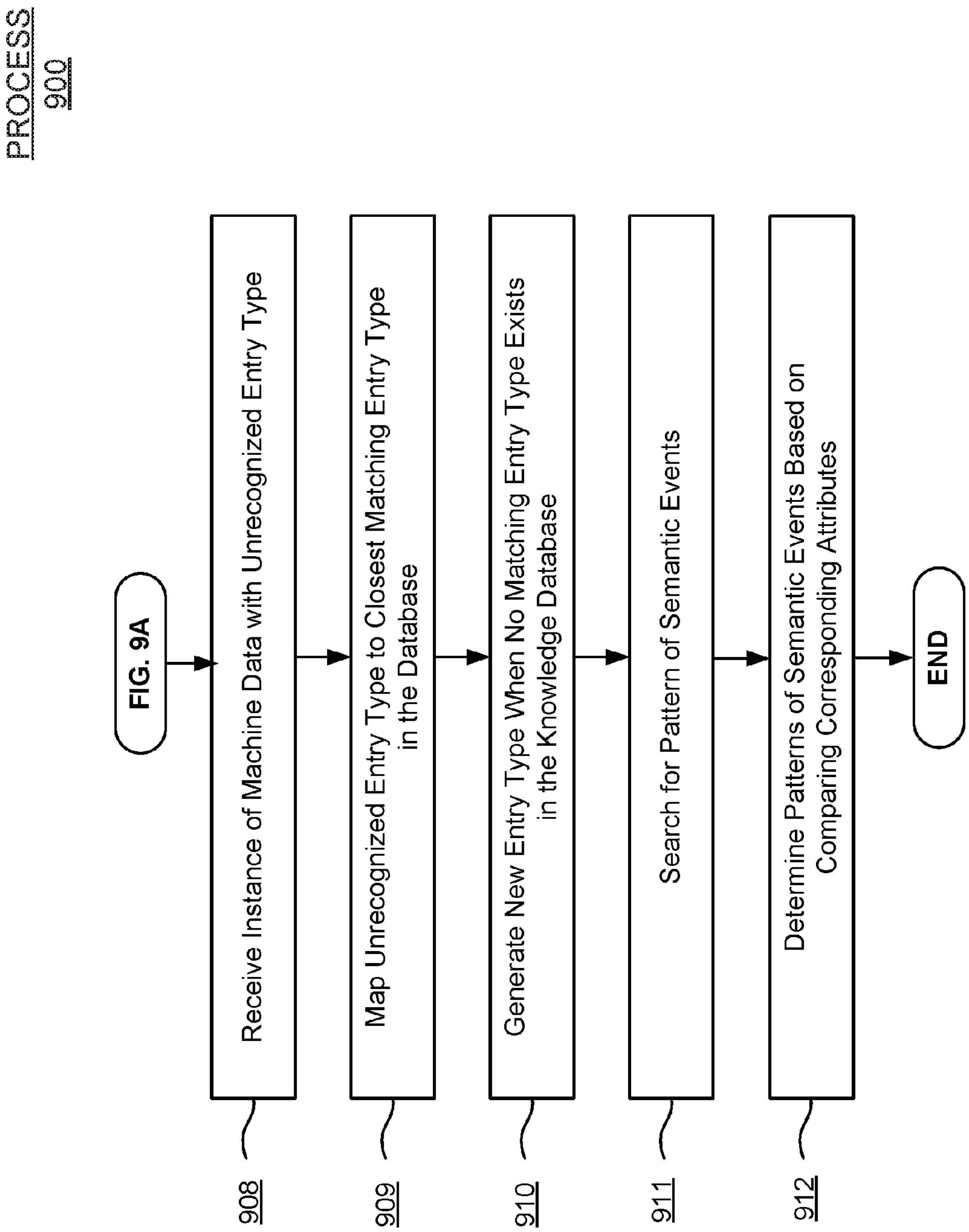

FIGS. 9A-9B depict a flow chart of an example embodiment of a process for processing machine data according to the techniques described herein. It is noted that the processes described below are exemplary in nature and are provided for illustrative purposes and not intended to limit the scope of the invention to any particular example embodiment. For instance, processes in accordance with some embodiments described herein may include or omit some or all of the operations described below, or may include operations in a different order than described herein. The particular operations described are not intended to be limited to any particular set of operations or order of operations exclusive of all other intermediate operations.

In addition, the operations described herein may be embodied in computer-executable code, which when executed, causes a general-purpose or special-purpose computer to perform certain functional operations. In other instances, these operations may be performed by specific hardware components or hardwired circuitry, or by any combination of programmed computer components and hardware circuitry.

The embodiments described herein include techniques for processing machine data according to the techniques described herein. In the illustrated embodiment of FIG. 9A, process 900 begins by receiving an instance of machine data from a machine data source (operation 901). The instance of machine data may include text and one or more variables. Process 900 continues by extracting the text and variables from the instance of machine data (operation 902) and mapping an entry type for the machine data to a matching entry type stored in a database (operation 903). The entry type may be based on comparing the text and variables of the instance of machine data with corresponding text and variables of a plurality of entry types stored in the database. In one embodiment, the database may comprise an instance database configured to store semantic-event to entry-type mapping data.

Process 900 continues by assigning an entry type to the instance of machine data that matches with the instance of machine data based on the comparison (operation 904), relating the entry type assigned to the instance of machine data with a set of attributes (operation 905), and mapping the entry type to a semantic event (operation 906). Each semantic event may be associated with a set of standard semantic events stored in the database. An entry for the instance of machine data in the database can then be built (operation 907). The entry in the database may include the semantic event, corresponding set of attributes, and the mapping between the semantic event and the entry type for the instance of machine data.

The entry for the instance of machine data can then be stored in a data structure of the database. In one embodiment, building entries in the database may include storing the variables of the instance of machine data into semantic attributes associated with the semantic event in the data structure.

Process 900 continues at operation 908 described in FIG. 9B. In the illustrated embodiment, process 900 continues by receiving an unrecognized entry type for an instance of machine data (operation 908) and mapping the unrecognized entry type to a closest matching entry type stored in the database (operation 909). In one embodiment, the closest matching entry type may be determined based on matching text and variables of the unrecognized entry type with a threshold amount of text or variables of each of the entry types stored in the database. Process 900 continues by generating a new entry type for the unrecognized instance of machine data based on the text and variables of the unrecognized entry type when no matching entry type exists in the database (operation 910).

The syntax of a core meaning for the instance of machine data may relate the semantic event to the set of attributes. Process 900 continues by searching for a pattern of semantic events (operation 911). In one embodiment, the searching can be performed across multiple different sources of machine data based on comparing known patterns of semantic events. Related semantic events in the patterns of semantic events may then be determined based on comparing attributes of the semantic events (operation 912). This completes process 900 according to one example embodiment.

Figure 10:
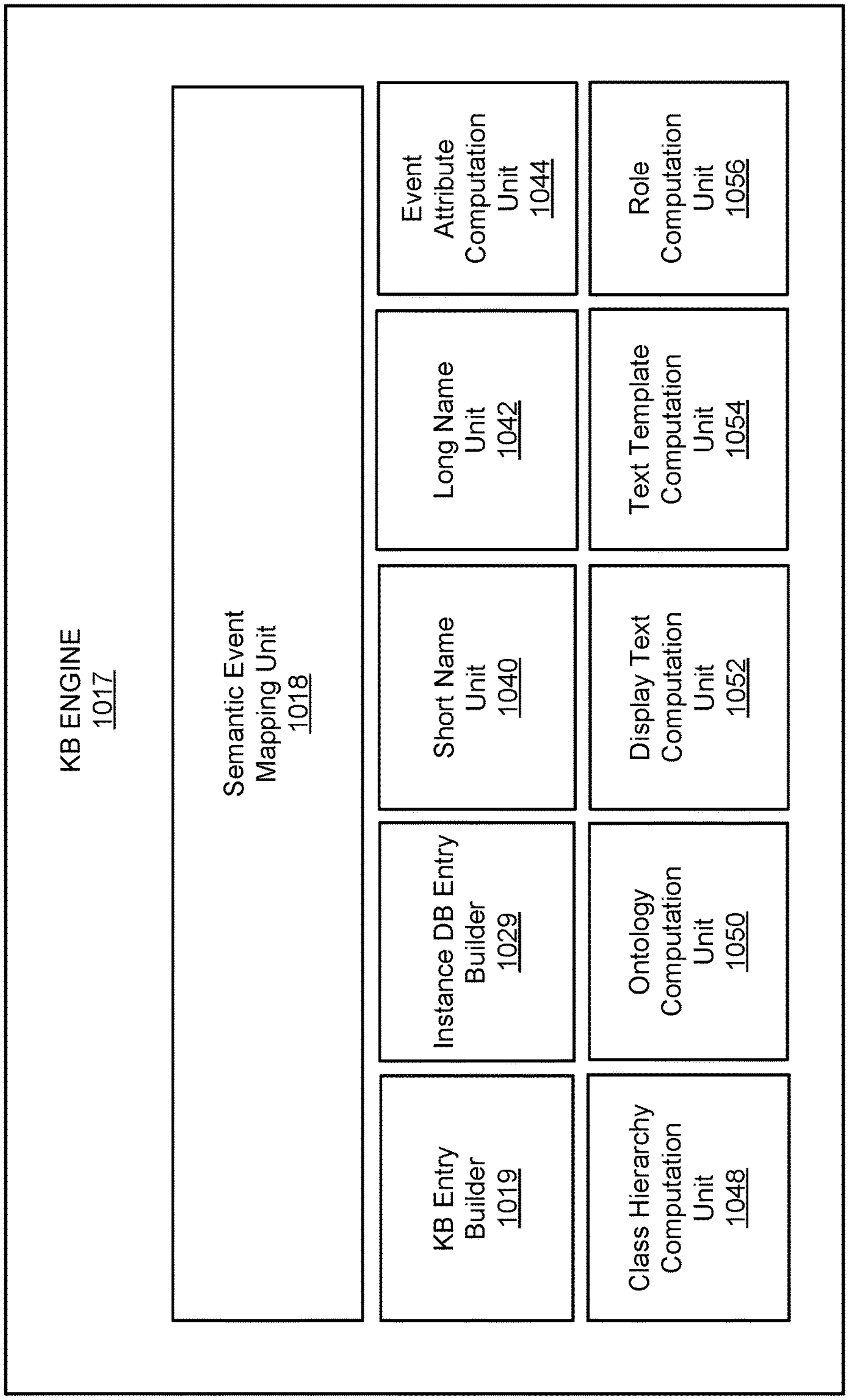
FIG. 10 depicts a block diagram of example embodiment of a knowledge base engine for processing machine data according to the techniques described herein.

FIG. 10 depicts a block diagram of example embodiment of a knowledge base engine for processing machine data according to the techniques described herein. In the illustrated embodiment, the knowledge base (KB) Engine 1017 includes a semantic event mapping unit 1018, an instance database entry builder 1029, and a KB entry builder 1019 as discussed above with respect to FIG. 4. KB engine 1017 further comprises a short name unit 1040, long name unit 1042, event attribute computation unit 1044, class hierarchy computation unit 1048, ontology computation unit 1050, display text computation unit 1052, text template computation unit 1054, and a role computation unit 1056, each discussed below.

Elements of Semantic Events

Semantic events may comprise generic events that are applicable across different systems that produce logs or other machine data—and they enable broad searches across the various logs. The main obstacle to the use of existing logs is that the meaning of the different log entry types is unclear, and is represented in different ways in different logs. As a solution, a semantic event is a standard way to represent the meaning of an event. Each log entry type with that meaning is assigned the same semantic event, which enables searches across log sources for the semantic event.

A semantic event may comprise the following main elements: (1) a marked-up sentence, called the "core meaning", (2) a parallel marked-up sentence, called the "abstract meaning", to relate the event to attributes and to indicate class hierarchy relations, (3) modifiers that modify the meaning of the action (e.g., remotely can modify a runService event), (4) a "box" module or process that gives the event an IT context (an example of a box is SystemAdmin, system administration events), and (5) an indication of whether the action of the event is a success or a failure. This field may be empty, e.g., unknown.

Core meaning markup sentence mapped with a semantic event in a knowledge database entry may comprise the action of receiving resource data from an initiator via an intermediary. For example, the syntax may comprise:

An: actor receive#s a resource: from an: initiator, via an :intermediary

The placeholders in the core meaning markup sentence in this example may include the action (e.g., receive#), the system/host roles (e.g., :reporter, :actor, :target, :intermediary, :initiator), username roles (e.g., :initiating, :acting, :targeting, :targeted), the trigger roles (e.g., :acting, :targeted), or the types of things in the event (e.g., resource:, service:, parameter:, privilege:, trigger:, etc.). The core meaning markup sentence identifies the verb of the sentence, plus related prepositions, the types of objects that participate in the action identified by the verb, the roles of the participants, for the case that multiple objects of the same type are involved, and in a few cases, the names of parameters involved in the event.

One purpose of the abstract meaning is to relate the semantic events to attributes, and to indicate class hierarchy relations.

An example of semantic event elements may include:

core meaning: An :actor create#s a Role:

abstract meaning: An :actor actions#s a Privilege:

modifiers: <none> box modlue: UserAdmin (event related to the administration of users), where the Markup key may comprise:

a "#" indication at end of verb, but before conjugation ending;

a "#" indication also in front of a preposition;

a ":" indication in front of a role, and at the end of a type; and a "!" indication to separate parameter name from parameter type (not shown).

From the elements of the semantic event above, the following elements may be computed: short name of event, long name of event, display text for event, entries for class hierarchies, roles involved in event, attributes involved in event, an ontology that enables consistency checks and automated computation of event hierarchies, and templates for text.

Process for Creating Semantic Events and Associated Attributes

The core meaning and the semantic attribute organization may be arrived at by a process that employs competency questions. The first question may be what happened? What was done (the verb)? To what (the objects)? Interpretation of a log entry type may require knowing which point of view is taken to represent the event. With primary semantic events, the point of view taken is the actor's point of view (i.e., the system that executes code) performs the action of the event, and decides that the event has occurred. Most events begin with "An :actor".

The markup sentence of the core meaning facilitates assigning attributes. It is in the context of a sentence that the answers to the competency questions can be consistently given. Consistent use of attributes is a pre-requisite to the productive use of logs. Semantic events may represent meaning for both humans and machines.

The short name unit 1040 of KB engine 1017 may be configured to compute a short name from the core meaning may include concatenating in order the verb, the prepositions, and the objects of the core meaning. If the outcome is "failure", add that word to the end. This may yield "CreateRole" with a display name Create role for the example above.

The long name unit 1042 may be configured to compute a long name from the core meaning. This may include concatenating the box unit to the first object in the core meaning, then concatenating all other prepositions and objects, except the first one. If the outcome is failure, add that word to the end. This may yield "UserAdminRoleCreate" with display name "User admin", "role", and "create" for the example above. One intent of the long names is to achieve a good alphabetic sorting. By putting the object first, all events with the same object appear together in the alphabetic list.

The display text computation unit 1052 may be configured to compute display text from core meaning. If the outcome is "success" or not known, based on the box unit, it may replace ":actor" with either "user' or "system". The focus of a "UserAdmin" event is the user who performs the action, so the user may be given precedence over the system that performs the action. This yields "a user creates a role". If the outcome is "failure", perform the replacement of ":actor", and then use the following template to generate the display text. An example text is: "A user tries to create a role, but fails" where ${ } may be a placeholder that is replaced with specific text as follows:

a ${actor} tries to ${action} ${rest}, but fails;

${actor} is the replacement for ":actor";

${action} is the part of the verb before the hash, e.g., "drop";

${rest} is the text that follows the verb in the positive form of the display text, Process to Compute Class Hierarchies Class hierarchies may be computed from the core meaning and abstract meaning using the class hierarchy computation unit 1048 in the KB engine. An object in a core meaning may become a subclass of the corresponding object in the abstract meaning. For example, this yields the following subclass relationships: "create" is a subclass of "action" and "Role" is a subclass of "Privilege".

core meaning: "An :actor create#s a Role:"

abstract meaning: "An :actor actions#s a Privilege:"

Any modifier for the event becomes a subclass of an "EventModifier". As an example, "remotely" becomes a subclass of "EventModifier" for the event "RunServiceRemotely". Any object following a shriek becomes a subclass of the corresponding object in the abstract meaning. For example, "UserAttribute" is a subclass of "Parameter".

"An :actor altars an Accounting_Number!User_Attribute #of a User:targeted"

"An :actor alter#s a Parameter: #of a User:targeted"

"AccountingNumber" may be the name of the user attribute that is modified, and so may be of type "ParameterName". It can become a subclass of that.

Process to Compute Roles Involved in Events

The role computation unit 1056 may be configured to extract the roles from the machined data. In one embodiment, "Roles" are preceded by a colon. Some roles imply that other roles might be present. For example, the actor role may be the role for a system, as opposed to a role for a user account. A key principle of semantic events is to separate system roles from user account roles. The "user account" under which the system runs the software involved in the event is assigned the role "acting". Whenever, an "actor' role is logged, a user account with the corresponding role "acting" may also be included in the event instance. Therefore, "acting' is added to the roles involved in the event.

Similarly, the system roles "initiator" and "target" have corresponding user account roles named "initiating" and 'targeting", respectively. To make them easy to differentiate, the system roles may be named using nouns, and the user account roles are named using adjectives. In addition, some event groups (box) like "UserAdmin" have implicit roles that can be made explicit. As explained in the section "Usernames, accounts, and pseudonyms," user accounts and privileges are valid in a particular domain, so it is necessary to specify the domain. Moreover, a domain may be required for both the "acting" role, the account that performs the action, as well as the "targeted" role—the target of the action. This means that "targeted" may be added to the roles for "UserAdmin" events.

Finally, it is assumed that any event may be initiated by a system and/or user different from the actor system and acting user. It is also assumed that the event may be reported by a system other than the actor. Thus, the following three roles may be added to events: "reporter", "initiator", and "initiating".

Process to Compute Attributes Involved in Events

The attributes involved in events may be computed in the event attribute computation unit 1044 of the KB engine. One purpose of computing the attributes associated with an event is to provide guidance on assigning variables in log entry types to semantic attributes, assuming that the log entry type represents the given semantic event. Attributes may be obtained from objects (attribute groups). The object names in the abstract meaning name groups of attributes. In the example, "An :actor action#s a Privilege:", "Privilege" is a group of attributes related to granting and revoking privileges. Although, each group is a bit different, in general, the mention of a group implies that at least the "type" and "name" or "id" attributes of that group are required by the event. "Name" and "Id" are near synonyms.

In this case, "PrivilegeType" and "PrivilegeName" are necessary. The core meaning, "An :actor create#s a Role:", is more specific than the abstract meaning, because it specifies the value (subclass), "Role", of the "PrivilegeType". The name of the role is found in an event instance, and is put in "PrivilegeName". In addition, for privilege events the following two attributes must be given to identify the domain of validity of the privileges: “UsernameDomainTypeTargeted” and “UsernameDomainIdTargeted”. Moreover, the “acting” user may be identified by the following three attributes: “UsernameActing”, “UsernameDomainTypeActing”, and “UsernameDomainIdActing”. “PrivilegeIsGrantable” is an optional attribute that specifies whether a recipient of the privilege is allowed to grant the role to others or not. The existence of optionality suggests a division of attributes into those that are mandatory, that is, must occur in, or be implied by, an instance, those that are likely to occur, and those that are less likely to occur.

In a few cases, a name may be explicit in the event, so does not need to occur in an instance.

An example comes from the event:

“An :actor alter#s an Accounting_Number!User_Attribute #of a User:targeted”;

“An :actor action#s a Parameter: #of a User:targeted”;

“UserAttribute may be put into “ParameterType”; and

“AccountingNumber” may be put into “ParameterName”.

“Alter” is a special action that requires attributes to hold the current and prior values of the attribute that is altered. These values may be differentiated by datatype. There are different attributes for strings, numbers and timestamps. For this reason, such events may also have an extra element, the datatype for the parameter. The attributes added for the “Parameter” group may depend on the action. If it is not “alter”, the current value is needed, otherwise the prior value is also needed. Attributes for current values include: “ParameterDatatype, ParameterValue<Datatype>”. The attribute for a prior value includes: “ParameterValue<Datatype>PriorValue”, where <Datatype> can be replaced by “string”, “number”, or “timestamp”.

The event attribute computation unit 1044 to compute the attributes for a group may depend on elements of the event like the event “action”. Such dependencies are represented in the knowledge base.

Attributes from Roles

The roles of an event are also input for computing attributes relevant to the event. Each user role may require a triple set of attributes to identify the user account. Attributes may also be needed to identify the system associated with a system role. In such a case, there may be three alternatives to identify a system: by the pair (SystemType<role>, SystemId<role>), by NetworkHostname<role>, or by NetworkIpAddress<role>. In principle, there might also be NetworkMacAddress<role>, but this is unusual, and is explicitly identified when it occurs, e.g., in the core meaning: “an :actor assign#s a NetworkIpAddress:initiator #to a NetworkMacAddress:initiator”. The “:actor and :initiator may# communicate# #via an :intermediary”.

This example also shows that mandatory attributes may be explicitly named in a core meaning. The actual names are, of course, the camel case version of the names, e.g., “NetworkIpAddressInitiator”. For each system role of the event, the abstract attribute “SystemIdentification:” may be made mandatory. The knowledge base represents this abstract attribute as the three alternatives given above.

Inclusion of Attributes from Groups Not Named in the Event, Default Assignments.

Some attributes may occur in any log instance. These are added to the “mandatory” or “likely” or “less likely” list of attributes for an event, if not already included by the event. Following is a list for each group. Any attributes not explicitly put in “mandatory” or “likely” are “less likely”. These assignments are default assignments, which may be overridden for particular semantic events.

Correlation

CorrelationId, likely;

CorrelationSubId, likely;

Event

EventLogType, mandatory;

EventMessage, mandatory;

Event, likely;

EventSeverityCode, likely;

EventSourceId, mandatory;

EventSourceType, mandatory;

EventScenarioRoleOfActor, likely, but mandatory if event has a scenario;

EventScenarioRoleOfInitiator, likely, but mandatory if event has a scenario;

EventScenarioRoleOfTarget, likely, but mandatory if event has a scenario.

Generic

GenericAction, mandatory

GenericOutcome, likely

GenericOutcomeReason, likely

GenericPath, less likely, but mandatory if a filename needs to be stored

GenericPathPrior, less likely, but mandatory if a filename needs to be stored.

Service

ServiceType, likely

ServiceOutcome, likely

Time

Timestamp, mandatory

Trigger

TriggerNameActing, likely

TriggerTypeActing, likely

Process to Compute Ontology of Semantic Events

The ontology computation unit 1050 may be configured to compute an ontology of semantic events. An ontology representation enables declarative definition of consistency checks, e.g., by using SPARQL, and the automated computation of event hierarchies that utilize existing reasoners like Hermit. Hierarchies are useful to limit a search to a subtree, or to expand it to a superclass. A web ontology language such as an “OWL” ontology representation of each semantic event can be automatically computed from the core meaning and abstract meaning of events. The subclass relations computed previously may be added as subclass relations in the OWL ontology. The event may be defined by specifying its action, its participants, and its modifiers. An example follows:

Core meaning: “An :actor block#s an HTTP_Request: #from an :initiator #to a :target”;

Abstract meaning: “An :actor actions#s a Resource:”

The event, “BlockHttpRequest”, may be defined as follows, using “Protégé” form:

“(hasAction exactly 1 block)”;

“and (hasActor exactly 1 System)”;

“and (hasInitiator exactly 1 System)”;

“and (hasTarget exactly 1 System)”;

“and (hasResource exactly 1 HTTP_Request)”.

“System, block”, and “HTTP_Request” are classes. “Block” is a subclass of “Action”, and “HTTP_Request” is a subclass of “Resource”, facts computed from a comparison of the core to the abstract meanings. The “has” elements name the properties. In normal English, the event “BlockHttpRequest” has one action, “block”. It has one actor system, one initiator system, one target system, and one resource, which is an “HTTP_Request”. Not shown here is the "hasModifier" property, and other properties such has "hasPrivilege", and "hasGrantee", which are computed for other events.

In addition, disjoint relations between classes may also be automatically added from an antonym list, e.g., that certain actions such as "block" and "allow" are disjoint. Some relationships can also be added heuristically, e.g., that an HTTP_Request is a subclass of HTTP_Message, which is a subclass of Message, etc.

Process to Compute Templates for Text

A list of text templates may be computed by the text template computation unit 1054 and used to display an instance of a log entry type. Templates may be computed in unit 1054 similarly to the way display text is computed based on the core meaning. The computation may also be related to the assignment of attributes to events, since text templates have placeholders that are adapted to be replaced by values of attributes. Given that not all attributes need be present, the text templates may consist of alternatives, with their order representing the preference order. The first template of an alternative list may be used.

The below example may be used to illustrate the nature of the process to compute text templates; "An :actor grant#s a Privilege: #to a Grantee:". Because the box of this event is "UserAdmin", it is expected that a user, rather than a system, is the actor in this event. Thus templates are user based. There may be multiple lists, each of which may add to the text generated for an instance.

List 1: list condition: PrivilegeGranteeType not equal to "User".

Alternative 1: Both Privilege and Grantee have Names:

"A user ${UserPseudonymActing} from domainUsernameDomainTypeActing}/${UsernameDomainNameActing} grants a ${PrivilegeType} named ${PrivilegeName} to a ${PrivilegeGranteeType} named ${PrivilegeGranteeName}."

Alternative 2: No name for privilege:

"A user ${UserPseudonymActing} from domain $UsernameDomainTypeActing}/${UsernameDomainNameActing} grants a ${PrivilegeType} to a ${PrivilegeGranteeType} named ${PrivilegeGranteeName}."

Alternative 3: No name for grantee:

"A user ${UserPseudonymActing} from domain $UsernameDomainTypeActing}/${UsernameDomainNameActing} grants a ${PrivilegeType} named ${PrivilegeName} to a ${PrivilegeGranteeType}."

Alternative 4: No name for privilege, no name for grantee:

"A user ${UserPseudonymActing} from domain $UsernameDomainTypeActing}/${UsernameDomainNameActing} grants a ${PrivilegeType} to a ${PrivilegeGranteeType}."

List 2: list condition: PrivilegeGranteeType equals "User":

Alternative 1: privilege has name:

"A user ${UserPseudonymActing} from domain $UsernameDomainTypeActing}/${UsernameDomainNameActing} grants a ${PrivilegeType} named ${PrivilegeName} to a ${UserPseudonymTargeted}."

Alternative 2: No name for privilege:

"A user ${UserPseudonymActing} from domain $UsernameDomainTypeActing}/${UsernameDomainNameActing} grants a ${PrivilegeType} to a ${UserPseudonymTargeted}."

List 3:

The domain of the privilege and grantee are "${UsernameDomainTypeTargeted}/${UsernameDomainNameTargeted}."

List 4:

alternative 1: "System ${SystemTypeInitiator}/${SystemIdInitiator} initiates the action";

alternative 2: "Host ${NetworkHostnameInitiator} (${NetworkIpAddressInitiator}) initiates the action";

alternative 3: "Host ${NetworkHostnameInitiator} initiates the action";

alternative 4: "Host ${NetworkIpAddressInitiator} initiates the action."

List 5:

The event and/or the logging of the event is triggered by "${TriggerTypeActing} named ${TriggerName Acting }".

List 4 may result from the three alternatives to identify a system: by the pair (SystemType<role>, SystemId<role>), by NetworkHostname<role>, or by NetworkIpAddress<role>.

Knowledge Base (KB)

The information computed about semantic events may be stored in a knowledge base (KB), and may be supplemented with rules that check the consistency of use of attributes by events. New semantic events can be added that build on, and extend, the existing semantics represented in the knowledge base. No existing standards for representing events explicitly relate the events of the standard to the attributes provided in the standard. Neither do existing systems have an extension mechanism that adds semantics; nor do they provide semantics for both humans and machines.

Semantic roles relate active entities to events. Active entities include systems or hosts, user accounts and pseudonyms (which represent real users in different ways), and triggers like audit policies, firewall rules, etc. In machine data learning, the account name (also called username) may be present. In the search system, only the pseudonyms for real users are visible to protect user privacy.

System/Host Roles:

nouns: initiator, actor, intermediary, target, reporter;

Account (Also Called User) Roles:

adjectives: initiating, acting, targeting, targeted (for direct object of action).

Nouns and 'ing' adjectives correlate, e.g., initiator, initiating. For example, for most events the actor system or host runs under the acting account. Likewise for the pairs: (initiator, initiating), and (target, targeting). Systems and hosts act and log (report).

Roles for Systems and Hosts:

"actor", executes software to perform the action that is logged. The software runs under the acting account;

"reporter", writes events to a log. Often the actor and reporter are the same system;

"initiator", asks the actor to perform the action of the event, e.g., an end device asks an system to run a transaction; and "target", a host or system that the actor asks to perform some function, e.g., an actor requests a remote system, the target, to run a program.

Trigger Roles:

"acting:" a trigger that causes an event to occur, and/or to be logged. An audit policy is an example of a trigger. System actions that match an audit policy of a system may be logged by the system; and "targeted:" a trigger that is the target of an action, e.g., "alter". There may also be an audit policy in the acting role that causes logging of modifications to a trigger.

Note that all semantic events potentially have initiator and initiating roles. Every event might also have a "Trigger: acting", which might cause the event, and/or cause it to be logged. Note also that actor and reporter are not always the same. For example, some web filter software can be installed on a web client, so that the client blocks or allows requests, and then uploads the block or allow event to the web filter to be reported. In this case, the actor is the web client, and the reporter is the web filter. To make this clear, events that occur on the web client have "EventScenarioRoleOfActor" set to "Web Client".

The method for representing semantic events may separate system/host roles from account roles and trigger roles. One reason for this is that the system and account/user roles do not always coincide. Logon is a good example. Software, running on an actor, often under a System account (acting) may perform authentication of a supplied user account, the targeted user. This is expressed using the following core meaning:

"An :actor authenticate#s a user:targeted, and create#s a Session: #for the user:targeted";

"computed shortname: AuthenticateUserAndCreateSessionForUser."

Implicit in the term "user:targeted" is the triple of "UsernameTargeted", "DomainTypeTargeted", and "DomainNameTargeted".

Ways Of Assigning Roles (1) direction relative at the network level;

(2) action relative—relative to the action of the event, actor is system or host that acts, that executes, the event action, other roles of participants are also relative to the action, example: RunServiceRemotely has the "roles: initiator, actor, target", an initiator initiates the actor's actions, and a target is the system that the actor asks to run a service; and (3) scenario relative—like action relative except that the event is part of a scenario, and if the roles of participants in the event do not change during the scenario, then the roles assigned are relative to the initial action of the scenario, e.g. DHCP events, the DHCP client, DHCP server, and DHCP relay are the same for the entire scenario from requesting an IP to being assigned the IP, client is initiator, server is target, relay is intermediary, and similarly web filter events with the web filter as the actor, are also scenario relative, the client is the initiator, the server the target.

Scenario-Relative Roles

Assume that the web filter is blocking or allowing HTTP requests and responses between the web client and server. The web filter is the actor, because it performs the actions: allow or block.

Client sends request to Web server via Web filter:

[Client]-------->[Web filter]----->[Web server]

:initator :actor :target

Web server sends response to request via Web filter:

[Client]<--------[Web filter]<-----[Web server]

:initiator :actor :target.

The Web filter logs the result of the interchange. It logs itself as the actor, the client as the initiator, and the server as the target. Scenario-relative roles may be the same for the whole scenario, regardless of the direction of messages.

Direction-Relative Roles:

At the network level things are different, because packets are blocked or allowed based upon the source or destination IP addresses and ports. Unlike the web scenario, the source and destination change as the direction of travel of packets changes. Assume that the Firewall is blocking or allowing packets, and is between a web client and server. The Firewall is the actor, because it performs the actions: allow or block.

Client sends request to Web server:

[Client]-------->[Firewall]----->[Web Server]

:initator :actor :target

Web server sends response to request:

[Client]<--------[Firewall]<-----[Web server]

:target :actor :initiator.

As can be seen, at the network level the roles of the client and server change as the direction of the packets change. However, if the firewall knows that a packet is an HTTP request, it can set "EventScenarioRoleOfInitiator" to "HTTP_Client". Similarly, if it knows the packet is an HTTP response, it can set the attribute to "HTTP_Server".

Usernames, Accounts, and Pseudonyms

In this section , "DomainType" and "DomainName" are short for the attributes "UsernameDomainType" and "UsenameDomainName", respectively. A user account may be identified by a triple: "Username", "DomainType", "DomainName", where the domain is the domain of validity of the username. It identifies the system that can resolve the username to a real user.

The "domain type" and "domain name" are the same as a "system type" and "system id" for an ABAP system because the domain of validity of an ABAP user account is an ABAP system. An ABAP "system id" is the "ID" plus the "client number", e.g., "CRM/00". The "system type" is ABAP. A real user often has accounts in different domains (systems), e.g., one real user may have two accounts: "Smith/ABAP/CRM/00" and "Smith2/ABAP/SCM/00". All accounts for the same real user are assigned the same pseudonym, because a pseudonym is intended to represent one real user.

Example of Problem of Unclear Meaning of a Log Entry Type

An example log entry type may be identified by a code "AUK". Successful RFC Call "&C". The function module specified in the message was called "&C" is a placeholder for the variable that names the function module. Example instance of log entry type: format is: "code; text with placeholders for variables; variables separated by semicolons".

AUK; Successful RFC Call "&C"—the function module specified in the message was called: "get_widget_list".

This event is ambiguous. Two systems are usually involved in the event because it is a Remote Function Call. This event is written by one of the systems, but it is not clear which one, the client (caller) or server (callee). This makes the event ambiguous. To disambiguate the event, a choice must be made between two unambiguous events:

"an :actor call#s an rfc_function_module: (This is the event a client would report)";

"an :actor runs#s an rfc_function_module: (This is the event a server would report)."

A client "calls" an RFC function module, a server "runs" it, at the request of the client. For this log entry type, it is known that the system that reports the event is the one that executes the code related to the event. In order to fix the standpoint from which to ask questions about an event, the system that executes code to perform the action of an event may be fixed as the actor system. Other systems involved in the event are usually given roles relative to the actor. For example, a system that asks the actor to perform the action is assigned the initiator role.

In the case of this log entry type, the correct semantic event is: "an :actor runs#s an rfc_function_module:". In other words, the actor is the server. The server runs the software, or to put it another way, the function module runs on the actor.

This interpretation is reinforced by setting the attributes for a client/server scenario (a scenario is a related series of events, e.g., a client/server scenario, like sendHttpRequest, followed by reactToHttpRequest or callRfcFunctionModule, followed by runRfcFunctionModule.). EventScenarioRoleOfActor is set to "Server", EventScenarioRoleOfInitiator is set to "Client".

In the knowledge base, the log entry type, AUK, is assigned the correct semantic event to make its meaning unambiguous. The knowledge base is also extended with instructions to store the value of the first (and only) variable of instances of this log entry type in the attribute ServiceFunctionName. Note that every semantic event is understood to potentially have initiator and initiating roles to identify which system/host and user asked the actor to perform the action. Every event might also have a Trigger: acting, which identifies the trigger that causes the event, and/or causes the event to be logged.

Attributes

Attributes are mostly organized around entity types: 1. Element=Group, usually a type of entity; 2. Middle: the Attribute proper, an attribute of the entity; and 3. Last Element=Role, if applicable to type.

TABLE 1

Attribute groups

| Group | Description |
|---|---|
| Attack | Attack Type and Attack Name of a suspected attack. For example, the Attack Type could be "Malware" and the attack name would be the name of the actual malware. |
| Correlation | Correlation ID and Correlation Sub ID if multiple events share the same IDs, these events are related. |
| Event | Attributes that relate to the event as a whole. |
| Generic | Attributes that might apply to different entity types. |
| Network | Attributes related to the network level, for example Network Protocol. |
| Parameter | Attributes related to the parameters of an object, for example the user. A parameter of the user could be the user password. |
| Privilege | Attributes needed to describe the administration of user privileges. |
| Resource | Attributes that describe the passive elements of an IT system, such as messages, files, or database tables. |
| Service | Attributes that describe the active elements of an IT system, such as transactions, programs, or web services. |
| System | Attributes that identify an IT system and how it is used, for example as a test system or as a productive system. |
| Time | Attributes about the point of time the event happened and itsduration. |
| Trigger | Attributes to identify a trigger of an event and/or a trigger of its logging. Examples of triggers are audit policies, timers, security configurations, etc. |
| User and Username | Attributes that identify a user account or user and the domain of validity of the user account. |

Roles

Semantic roles relate active entities to events. Active entities are: systems or hosts, identified by (SystemType, SystemId) or Hostname, or IpAddress, user accounts and pseudonyms (represent real users in different ways), triggers like audit policies, firewall rules, etc. In log instances, the account name (also called username) is present. After processing of instances, only the pseudonyms for real users are visible to protect user privacy. As an aid to remembering the roles and how they are related, the following conventions are used: system/host roles are nouns: initiator, actor, intermediary, target, reporter; account (also called user) roles are adjectives: initiating, acting, targeting, targeted (for a user account that is the target of an action, e.g., create, delete, etc.); and trigger roles are also adjectives: acting, targeted (for a trigger that is acted upon, e.g., created, altered, etc.).

Nouns and 'ing' adjectives roles, e.g., actor and acting are related. For example, for most events the actor system or host runs the software under the acting account. Likewise for the pairs: (initiator, initiating), and (target, targeting).

TABLE 2

System/Host Roles

| Actor | The system that executes the software to perform the action that is logged. The software runs under the acting user account. |
|---|---|
| Initiator | The system that asks the actor to perform the action of the event, e.g., an end device that asks an SAP system to run a transaction plays the initiator role. |
| Intermediary | In some events, the system that mediates between two other systems, usually between initiator and actor. |
| Reporter | The system that writes events to a log. Often the actor and reporter are the same system. |
| Target | The system that the actor asks to perform some function, e.g., an actor requests a remote system, the target, to run a program. The targeting account is the account under which the target is to run the software. |

Example Where Actor and Reporter Include Different Systems

Actor and reporter are not always the same. For example, some web filter software is installed on a web client, so that the client blocks or allows requests, and then uploads the block event or allow event to the web filter to be logged in the Web filter log. In this case, the actor is the web client, and the reporter is the web filter. To make this clear, events that occur on the web client have "EventScenarioRoleOfActor" set to "Client". If the web filter itself performs the block or allow action, "EventScenarioRoleOfActor" set to "Proxy".

TABLE 3

User/Account Roles

| Acting | The user account under which the software on the actor system runs. |
|---|---|
| Initiating | The user account under which the software on the initiator system runs. |
| Targeted | In user administration, the account that is created, modified, or deleted. In logon, the account that is authenticated. |
| Targeting | The user account under which the software on the target system is to run. |

Why do we need different roles for systems and users? The method for representing semantic events separates system/host roles from account roles, and trigger roles. One reason for this is that the system and account/user roles do not always coincide. Logon is a good example. Software, running on an actor, often under a System account (acting) performs authentication of a supplied user account, the targeted user. This is expressed using the following core meaning:

"An :actor authenticate#s a user:targeted, and create#s a Session: #for the user:targeted";

"computed shortname: AuthenticateUserAndCreateSessionForUser."

Implicit in the term "user:targeted" is the triple of "UsernameTargeted", "DomainTypeTargeted", and "DomainNameTargeted". At the request of an "Initiator" (for example a HANA client), the "Actor" (for example a HANA database) authenticates a "User Account Name Targeted". The "Initiator" tells the "Actor" that his account is "User Account Name Initiating". The authentication software on the "Actor" runs under the "User Account Name Acting".

EXAMPLE

Employee Thomas Smith is logged in as D02 on his laptop. Then he logs onto a HANA database using his database user account TSMITH. HANA performs the logon under the user account SYSTEM. HANA database (the actor) writes a log entry that has the following semantics: "An actor, the HANA database, authenticates a targeted account."

The log entry has three user accounts with the following roles: 1. D02 (initiating account), this goes in the attribute is UsernameInitiating; 2. TSMITH (targeted account), this goes in the attribute is UsernameTargeted; and 3. SYSTEM (acting account), this goes in the attribute UsernameActing. In this example, two systems are involved: the laptop and the HANA system. The laptop plays the role of the "Initiator" and the HANA system plays the role of the "Actor".

A trigger may have one of two roles.

TABLE 4

| Triggers | |
|---|---|
| Acting | a trigger that causes an event to occur, and/or to be logged. An audit policy is an example of a trigger. System actions that match the conditions stated in an audit policy of a system are logged by the system. |
| targeted: | a trigger that is the target of an action, e.g., 'alter'. There may also be an audit policy in the acting role that causes logging of modifications to a trigger. |

Here is an example that focuses only on the trigger roles:

Audit_policy_1 is changed;

Audit_policy_2 states condition: when any audit policy is changed, write an audit log entry.

A HANA database (the actor) writes a log entry that has the following semantics: "An actor, the HANA database, alters an audit policy named Audit_Policy_1." The logging of this event may be triggered by an audit policy named Audit_Policy_2.

The values of the relevant attributes may be set as follows:

Trigger Type Targeted: Audit Policy;

Trigger Name Targeted: Audit_Policy_1;

Trigger Type Acting: Audit Policy; and

Trigger Name Acting: Audit_Policy_2.

The advantages of the techniques described herein are numerous. First, the knowledge base can be utilized to generate higher quality logs that can be directly utilized to perform productive work. For example, high quality logs (or other machine data) may be fed directly into threat detection systems to make threat detection more effective. Patterns of semantic events can be searched across machine data from multiple different sources to identify patterns that may suggest an attack or other security issue. For example, the system can be instructed to locate all successful logon events that closely follow the creation of an account used to attempt the logon. Events and attributes can be used in a search pattern to find patterns that span events.

A series of structured questions about a log entry type may be asked. The answers to these questions include the name of the attributes into which values from an instance of the machine data are placed in the data structures of the knowledge database. By leading to a consistent use of attributes, embodiments described herein enable searching across logs from different services that log the same or similar events.

III. Exemplary Hardware Implementation

Embodiments of the present invention may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 11:
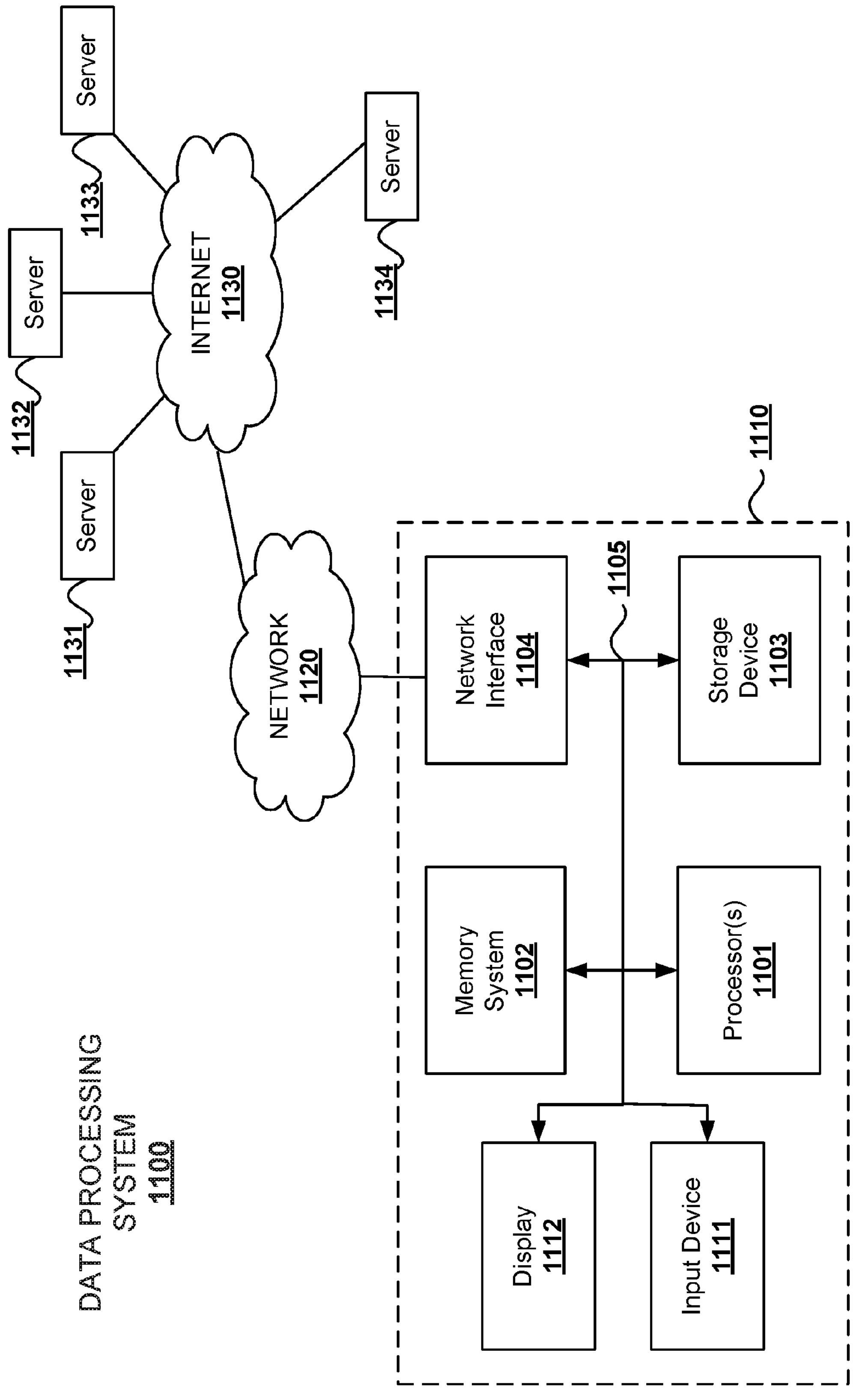
FIG. 11 depicts an example overview block diagram of a data processing system upon which the embodiments described herein may be implemented.

FIG. 11 depicts an example overview block diagram of a data processing system upon which the embodiments described herein may be implemented. The following hardware description is merely one example. It is to be understood that a variety of computers configurations may be used to implement the described techniques. While FIG. 11 illustrates various components of a data processing system 1100, it is not intended to represent any particular architecture or manner of interconnecting components. It will also be appreciated that network computers and other data processing systems, which have fewer components or additional components, may be used. The data processing system 1100 may, for example, comprise a personal computer (PC), workstation, laptop computer, tablet, smartphone or other hand-held wireless device, or any device having similar functionality.

In the illustrated embodiment, data processing system 1100 includes a computer system 1110. Computer system 1110 includes an interconnect bus 1105 (or other communication mechanism for communicating information) and one or more processor(s) 1101 coupled with the interconnect bus 1105 for processing information. Computer system 1110 also includes a memory system 1102 coupled with the one or more processors 1101 via the interconnect bus 1105. Memory system 1102 is configured to store information and instructions to be executed by processor 1101, including information and instructions for performing the techniques described above. This memory system may also be used for storing programs executed by processor(s) 1101. Possible implementations of this memory system may be, but are not limited to, random access memory (RAM), read only memory (ROM), or combination thereof.

In the illustrated embodiment, a storage device 1103 is also provided for storing information and instructions. Typically storage device 1103 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 1103 may store source code, binary code, or software files for performing the techniques above. In addition, while FIG. 11 shows that storage device 1103 as a local device connected with the components of the data processing system, it will be appreciated by skilled artisans that the described techniques may use a storage device remote from the system, such as a database or other network storage device coupled with the computer system 1110 through a network interface such as network interface 1104.

Network interface 1104 may provide communications between computer system 1110 and a network 1120. The network interface 1104 may be a wireless or wired connection, or any combination thereof. Computer system 1110 is configured to send and receive information through the network interface 1104 across one or more networks 1120 such as a local area network (LAN), wide-area network (WAN), wireless or Bluetooth network, or the Internet 1130, etc. Computer system 1110 may access data and features on systems residing on one or multiple different hardware servers 1131-1134 across the network 1120. Hardware servers 1131-1134 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 1110 may be coupled via interconnect bus 1105 to a display 1112 for displaying information to a computer user. An input device 1111 such as a keyboard, touchscreen, and/or mouse is coupled to bus 1105 for communicating information and command selections from the user to processor 1101. The combination of these components allows the user to communicate with the system. In some systems, bus 1105 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the present disclosure. It will be apparent, however, to persons skilled in the art that these embodiments described herein may be practiced without some of these specific details. The above examples and embodiments should not be deemed to be the only embodiments, and are presented to illustrate the flexibility and advantages of the present disclosure. Other arrangements, embodiments, implementations, or equivalents will be evident to those skilled in the art, and may be employed without departing from the spirit and scope of the present disclosure as defined by the claims recited herein.

What is claimed is:

1. A method for processing machine data comprising:

receiving an instance of machine data from a data source comprising text and one or more variables, wherein the instance of machine data comprises a set of log entries generated by a computing device on which the data source is operating;

extracting the text and variables from the instance of machine data;

determining whether an entry type for the instance of machine data is a recognized entry type;

upon determining that the entry type for the instance of machine data is a recognized entry type:

mapping an entry type for the instance of machine data to a matching entry type stored in a database based on comparing the text and variables of the instance of machine data with corresponding text and variables of a plurality of entry types stored in the database;

assigning an entry type to the instance of machine data that matches with the instance of machine data based on the comparison;

relating the entry type assigned to the instance of machine data with a set of attributes;

mapping the entry type to a semantic event;

building an entry for the instance of machine data in the database, wherein the entry in the database comprises the semantic event, the set of attributes, and the mapping between the semantic vent and the entry type for the instance of machine data; and storing the entry in a data structure of the database upon determining that the entry type for the instance of machine data is not a recognized entry type, performing machine learning operations on the instance of machine data by:

determining whether the text and variables of the instance of machine data match with a threshold amount of text or variables of an entry type stored in the database;

upon determining that the text and variables of the instance of machine data match with the threshold amount of text or variables of an entry type stored in the database, assigning a closest entry type to the instance of machine data; and upon determining that the text and variables of the instance of machine data match with the threshold amount of text or variables of an entry type stored in the database, generating a new entry type based on comparing the instance of machine data with entry types stored in the database, assigning the new entry type to the instance of machine data, and storing the new entry type in the database.

2. The method of claim 1, wherein building the entry in the database comprises storing the variables of the instance of machine data into semantic attributes associated with the semantic event in the data structure.

3. The method of claim 1, wherein performing the machine learning operations on the instance of machine data is further by determining a matching core meaning from core meanings associated with semantic events based on the text and the variables of the instance of machine data.

4. The method of claim 1, wherein performing the machine learning operations on the instance of machine data is further by generating a new core meaning for the instance of machine data.

5. The method of claim 1, wherein syntax of a core meaning assigned to the semantic event relates the semantic event to the set of attributes.

6. The method of claim 1 further comprising searching for a pattern of semantic events across multiple different sources of machine data based on comparing known patterns of semantic events with semantic events assigned to instances of the machine data.

7. The method of claim 1 further comprising determining related semantic events in patterns of semantic events based on comparing attributes of the semantic events.

8. A system for processing machine data comprising:

a processor in communication with a database over a communication network;

a system memory in communication with the processor via a communication medium, wherein the system memory is configured to store programmed computer code, which when executed by the processor, causes the processor to perform operations comprising:

receiving an instance of machine data from a data source comprising text and one or more variables, wherein the instance of machine data comprises a set of log entries generated by a computing device on which the data source is operating;

extracting the text and variables from the instance of machine data;

upon determining that the entry type for the instance of machine data is a recognized entry type:

mapping an entry type for the instance of machine data to a matching entry type stored in a database based on comparing the text and variables of the instance of machine data with corresponding text and variables of a plurality of entry types stored in the database;

assigning an entry type to the instance of machine data that matches with the instance of machine data based on the comparison;

relating the entry type assigned to the instance of machine data with a set of attributes;

mapping the entry type to a semantic event;

building an entry for the instance of machine data in the database, wherein the entry in the database comprises the semantic event, the set of attributes, and the mapping between the semantic event and the entry type for the instance of machine data; and storing the entry in a data structure of the database upon determining that the entry type for the instance of machine data is not a recognized entry type, performing machine learning operations on the instance of machine data by:

determining whether the text and variables of the instance of machine data match with a threshold amount of text or variables of an entry type stored in the database;

upon determining that the text and variables of the instance of machine data match with the threshold amount of text or variables of an entry type stored in the database, assigning a closest entry type to the instance of machine data; and upon determining that the text and variables of the instance of machine data match with the threshold amount of text or variables of an entry type stored in the database, generating a new entry type based on comparing the instance of machine data with entry types stored in the database, assigning the new entry type to the instance of machine data, and storing the new entry type in the database.

9. The system of claim 8, wherein the operation of building the entry in the database comprises storing the variables of the instance of machine data into semantic attributes associated with the semantic event in the data structure.

10. The system of claim 8, wherein performing the machine learning operations on the instance of machine data is further by determining a matching core meaning from core meanings associated with semantic events based on the text and the variables of the instance of machine data.

11. The system of claim 8, wherein performing the machine learning operations on the instance of machine data is further by generating a new core meaning for the instance of machine data.

12. The system of claim 8, wherein syntax of a core meaning assigned to the semantic event relates the semantic event to the set of attributes.

13. The system of claim 8, wherein the operations further comprise searching for a pattern of semantic events across multiple different sources of machine data based on comparing known patterns of semantic events with semantic events assigned to instances of the machine data.

14. The system of claim 8, wherein the operations further comprise determining related semantic events in patterns of semantic events based on comparing attributes of the semantic events.

15. A non-transitory computer readable storage medium embodying programmed computer code, which when executed by a computer system, causes the computer system to perform operations for processing machine data, the operations comprising:

receiving an instance of machine data from a data source comprising text and one or more variables, wherein the instance of machine data comprises a set of log entries generated by a computing device on which the data source is operating;

extracting the text and variables from the instance of machine data;

upon determining that the entry type for the instance of machine data is a recognized entry type:

mapping an entry type for the machine data to a matching entry type stored in a database based on comparing the text and variables of the instance of machine data with corresponding text and variables of a plurality of entry types stored in the database;

assigning an entry type to the instance of machine data that matches with the instance of machine data based on the comparison;

relating the entry type assigned to the instance of machine data with a set of attributes;

mapping the entry type to a semantic event;

building an entry for the instance of machine data in the database, wherein the entry in the database comprises the semantic event, the set of attributes, and the mapping between the semantic event and the entry type for the instance of machine data; and storing the entry in a data structure of the database upon determining that the entry type for the instance of machine data is not a recognized entry type, performing machine learning operations on the instance of machine data by:

determining whether the text and variables of the instance of machine data match with a threshold amount of text or variables of an entry type stored in the database;

upon determining that the text and variables of the instance of machine data match with the threshold amount of text or variables of an entry type stored in the database, assigning a closest entry type to the instance of machine data; and upon determining that the text and variables of the instance of machine data match with the threshold amount of text or variables of an entry type stored in the database, generating a new entry type based on comparing the instance of machine data with entry types stored in the database, assigning the new entry type to the instance of machine data, and storing the new entry type in the database.

16. The computer readable storage medium of claim 15, wherein the operation of building the entry in the database comprises storing the variables of the instance of machine data into semantic attributes associated with the semantic event in the data structure.

17. The computer readable storage medium of claim 15, wherein performing the machine learning operations on the instance of machine data is further by determining a matching core meaning from core meanings associated with semantic events based on the text and the variables of the instance of machine data.

18. The computer readable storage medium of claim 15, wherein performing the machine learning operations on the instance of machine data is further by generating a new core meaning for the instance of machine data.

19. The computer readable storage medium of claim 15, wherein syntax of a core meaning assigned to the semantic event relates the semantic event to the set of attributes.

20. The computer readable storage medium of claim 15, wherein the operations further comprise searching for a pattern of semantic events across multiple different sources of machine data based on comparing known patterns of semantic events with semantic events assigned to instances of the machine data.

* * * * *